(12) United States Patent
Grigoriev et al.

(10) Patent No.: US 8,370,863 B2
(45) Date of Patent: Feb. 5, 2013

(54) METHOD AND APPARATUS FOR INTEGRATING APPLICATIONS ON DEMAND TO DISPLAY AND MANIPULATE A SEMANTIC RESOURCE

(75) Inventors: Nikolai Grigoriev, Brossard (CA); Sylvain Fortin, St-Laurent (CA); Haraldur Thorkelsson, Kopavogur (IS); Sergey Boldyrev, Söderkulla (FI)

(73) Assignee: Nokia Corporation, Espoo (FI)

( * ) Notice: Subject to any disclaimer, the term of this patent is extended or adjusted under 35 U.S.C. 154(b) by 335 days.

(21) Appl. No.: 12/785,252

(22) Filed: May 21, 2010

(65) Prior Publication Data
US 2011/0289520 A1   Nov. 24, 2011

(51) Int. Cl.
G06F 9/44 (2006.01)
(52) U.S. Cl. .................................................. 719/331
(58) Field of Classification Search .................. 719/310, 719/331
See application file for complete search history.

(56) References Cited

U.S. PATENT DOCUMENTS

| | | | |
|---|---|---|---|
| 7,725,605 B2 | 5/2010 | Palmeri et al. | |
| 8,140,680 B2 * | 3/2012 | Behrendt et al. | 709/226 |
| 2003/0126136 A1 | 7/2003 | Omoigui | |
| 2006/0041641 A1 | 2/2006 | Breiter et al. | |
| 2009/0049179 A1 | 2/2009 | Ehms et al. | |
| 2009/0177777 A1 * | 7/2009 | Behrendt et al. | 709/226 |
| 2009/0265358 A1 * | 10/2009 | Morris | 707/10 |
| 2010/0011145 A1 | 1/2010 | Carver et al. | |
| 2010/0031240 A1 | 2/2010 | Drumm et al. | |

OTHER PUBLICATIONS

A Flexible Integration Framework for Semantic Web 2.0 Applications, Oren et al., abstract only, Software, Sep./Oct. 2007, vol. 24, No. 5, http://www.computer.org/portal/web/csdl/doi/10.1109/MS.2007.126, 1 page.
Active files: a mechanism for integrating legacy applications into distributed systems, Dasgupta et al., abstract only, Proceedings 20th International Conference on Distributed Computing Systems, IEEE, Apr. 10-13, 2000, 1 page.

* cited by examiner

*Primary Examiner* — Van Nguyen
(74) *Attorney, Agent, or Firm* — Ditthavong Mori & Steiner, P.C.

(57) ABSTRACT

An approach is provided for integrating applications on demand to display and manipulate a semantic resource. An integrating application causes, at least in part, reception of a request for a semantic resource, and determines whether the semantic resource is known to a first application. The integrating application discovers one or more properties of the semantic resource based, at least in part, on the determination. The integrating application identifies a second application associated with the semantic resource based, at least in part, on the one or more properties. The integrating application causes, at least in part, presentation of the semantic resource through the second application.

14 Claims, 15 Drawing Sheets

300

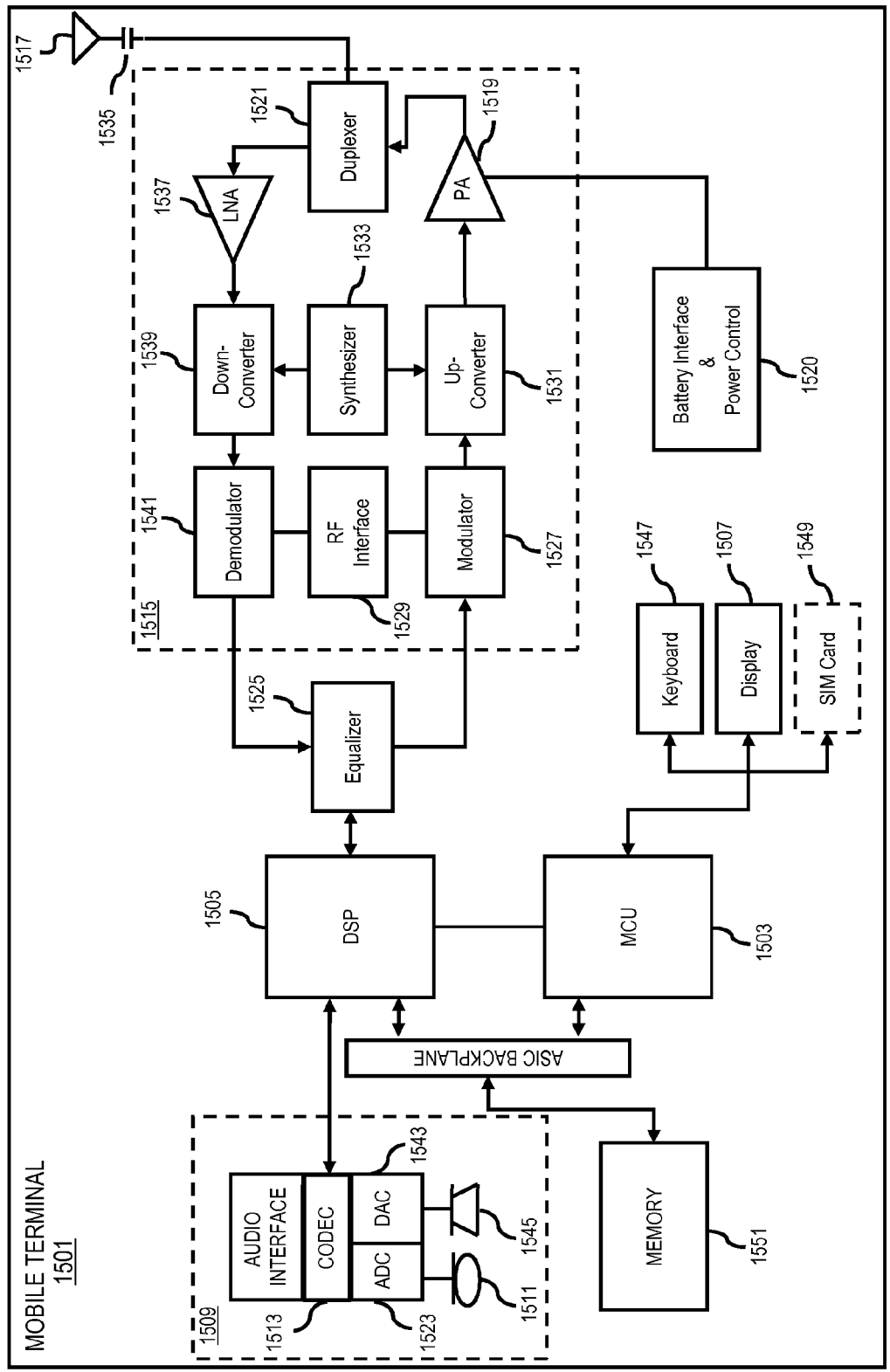

METHOD AND APPARATUS FOR INTEGRATING APPLICATIONS ON DEMAND TO DISPLAY AND MANIPULATE A SEMANTIC RESOURCE

BACKGROUND

Service providers (e.g., wireless, cellular, Internet, content, social network, etc.) and device manufacturers are continually challenged to deliver value and convenience to consumers by, for example, providing compelling network services and advancing the underlying technologies. One area of interest has been in developing ways to integrate applications to share the same semantic databases in the semantic web. The existing applications, including the ones based on the semantic web, are often built as mash-ups, i.e., one main application combining the views provided by other applications. The main application decides when and which of the other applications to invoke, based upon the use cases foreseen by the main application designer. The main application designer has to identify each use case, resolves the dependencies with the other applications, and makes the required calls. In the semantic web, the ontologies of the other applications can introduce additional entities that enable linking of their semantic data to the main application. However, the main application cannot take advantage of these links without modifying the main application code. This mash-up approach requires changes to the code of the main application and the other applications, and it merely statically links the applications to the use cases.

SOME EXAMPLE EMBODIMENTS

Therefore, there is a need for an approach for integrating applications on demand to display and manipulate a semantic resource.

According to one embodiment, a method comprises causing, at least in part, reception of a request for a semantic resource. The method also comprises determining whether the semantic resource is known to a first application. The method further comprises discovering one or more properties of the semantic resource based, at least in part, on the determination. The method further comprises identifying a second application associated with the semantic resource based, at least in part, on the one or more properties. The method further comprises causing, at least in part, presentation of the semantic resource through the second application.

According to another embodiment, an apparatus comprising at least one processor, and at least one memory including computer program code, the at least one memory and the computer program code configured to, with the at least one processor, cause, at least in part, the apparatus to receive a request for a semantic resource. The apparatus is also caused to determine whether the semantic resource is known to a first application. The apparatus is further caused to discover one or more properties of the semantic resource based, at least in part, on the determination. The apparatus is further caused to identify a second application associated with the semantic resource based, at least in part, on the one or more properties. The apparatus is further caused to present the semantic resource through the second application.

According to another embodiment, a computer-readable storage medium carrying one or more sequences of one or more instructions which, when executed by one or more processors, cause, at least in part, an apparatus to receive a request for a semantic resource. The apparatus is also caused to determine whether the semantic resource is known to a first application. The apparatus is further caused to discover one or more properties of the semantic resource based, at least in part, on the determination. The apparatus is further caused to identify a second application associated with the semantic resource based, at least in part, on the one or more properties. The apparatus is further caused to present the semantic resource through the second application.

According to another embodiment, an apparatus comprises means for causing, at least in part, reception of a request for a semantic resource. The apparatus also comprises means for determining whether the semantic resource is known to a first application. The apparatus further comprises means for discovering one or more properties of the semantic resource based, at least in part, on the determination. The apparatus further comprises means for identifying a second application associated with the semantic resource based, at least in part, on the one or more properties. The apparatus further comprises means for causing, at least in part, presentation of the semantic resource through the second application.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 15 is a diagram of a mobile terminal (e.g., handset) that can be used to implement an embodiment of the invention.

DESCRIPTION OF SOME EMBODIMENTS

Figure 1:
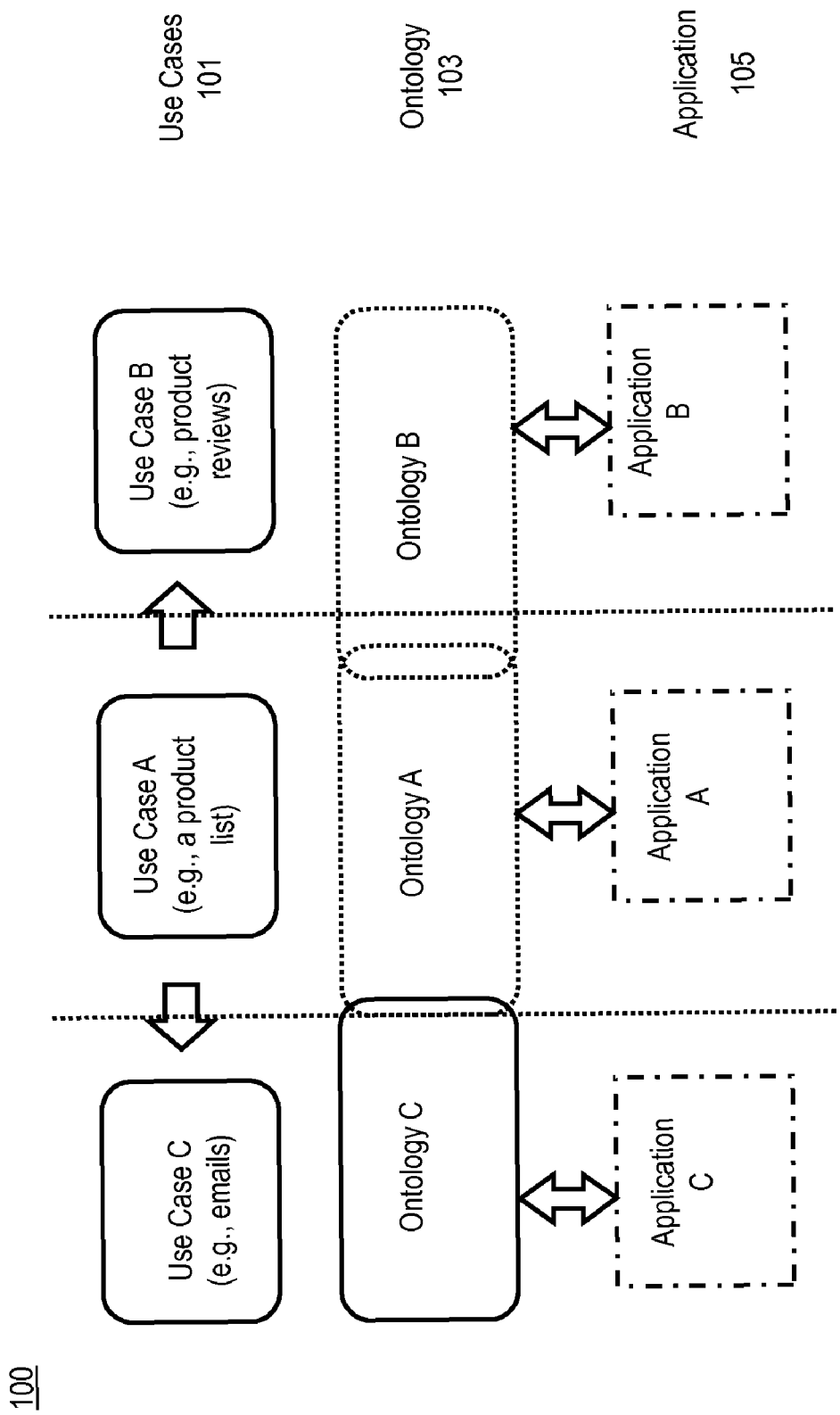
FIG. 1 is a diagram of a semantic web interoperability architecture, according to one embodiment.

A method and apparatus for integrating applications on demand to display and manipulate a semantic resource are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "plug-in" refers to a small software computer program that extends the capabilities of a larger program, and enables a third party using of the part of the larger application's functionality. This includes not only access to the larger application, but also the larger application data, network connections, etc. By way of example, plug-ins are commonly used in web browsers to enable the web browsers to play audio and/or video clips, and/or automatically decompress files. A plug-in is also called plugin, addin, add-in, addon, add-on, snap-in, snapin, or player.

As used herein, the term "resource" refers to data or anything else capable of being defined in the semantic web for completing a project activity, such as people, equipment, facilities, funding, etc. Resource scheduling, availability and optimization are considered in data management. A resource can be a piece of data that a service provides to its users or enables its user to share. Familiar examples include an electronic document, an image, a service (e.g., "today's financial news on the Stock Exchange"), and a collection of other resources. It is noted that not all resources are network "retrievable", e.g., people, equipment, facilities, funding, bound books in a library, etc. For example, Abstract concepts can be resources, such as the operators and operands of a mathematical equation, the types of a relationship (e.g., "parent" or "employee"), or numeric values (e.g., zero, one, and infinity). Providing a concept is given an identity, either the concept is expressed by an information representation format (e.g., Resource Description Framework (RDF) triples) or structure (e.g., RDF graphs), or its identity is expressed by given a well-formed Uniform Resource Identifier (URL), then the concept can be a resource as well.

As used herein, the term "triple" refers to a subject-predicate-object expression in RDF. A subject denotes the resource and is an RDF Uniform Resource Identifier (URI) reference or a blank node, a predicate is an RDF URI reference which denotes traits or aspects of the resource and expresses a relationship between the subject and the object, and an object is an RDF URI reference, a literal or a blank node. For example, one way to represent the notion "cat is a mammal" in RDF as the triple is: a subject denoting "cat," a predicate denoting "is a," and an object denoting "mammal."

The term "semantic web" refers to a universal medium for data, information, and knowledge exchange. This information exchange inserts documents with computer-comprehensible meaning (semantics) and makes them available on the semantic web. The semantic web is a "web of data" instead of the "web of documents". Knowledge in the semantic web is structured and organized at a finer level of granularity than free-text document, and the vocabulary includes not only literal words but also universal identifiers.

The term "smart space" refers to a plurality of information spaces of different entities in a "smart space architecture" that enables the entities and different semantic web tools to access heterogeneous information embedded in different semantic domains available for the semantic web tools. The semantic web is designed to share information based upon common representation formats, ontologies and semantics, such that information would become globally ubiquitous and interoperable. However much of the information is not desired to ubiquitous, but remain hidden, private and is interpreted locally, such as personal information. To address to this issue, the smart space architecture (an entity focused structure) is developed such that a user can encapsulate all of personal information and interact with the information in the smart space according to the user's individual semantics and needs. The user can be a person, an organization, or other entity.

Although various embodiments are described with respect to the smart space, it is contemplated that the approach described herein may be applied in other data-centric architectures in the semantic web. In addition, the use cases of product list, product review, and email the product information to a friend are used as examples. It is contemplated that the approach described herein may be applied in other any semantic use cases.

As mentioned, modern applications, including the ones based on the semantic web, are often built as mash-ups, i.e., a main application combining views provided by other applications. These views access their own data themselves. For example, if a main application needs to enable the user to send an email, it pops up an email composer (e.g., a plug-in), and provides the required parameters for the email composer. The email composer then performs all functions related to email composing and sending. The problem with this approach is that the main application needs decide beforehand when and which plug-ins to invoke for each particular use case foreseen by the main application designer, and writes the code to handle all relevant events. This approach works for the traditional applications since their data models are "siloed." This approach also works for existing semantic applications in conjunction with semantic databases. However, this approach statically links applications to use cases, and does not fully utilize the semantic databases.

Different semantic applications can interact/interfere with each other's data, by adding extra properties and links to data nodes belonging to the data domain of other applications. By way of example, considering an ontology A, a service B can enhance the ontology A by adding links from an ontology B to the ontology A. An ontology is a formal specification of a shared conceptualization. An ontology captures the structure of its own domain, by describing knowledge about the domain and defining a model of the domain with possible restrictions.

However, the conventional approach does not provide a way to explain to an application A of the service A regarding how to take advantage of new functionality and new data accessible via the links without changing the application. Therefore, the application A just ignores the additional links and properties of the objects coming from the service/ontology B, without taking advantage of the links.

FIG. 1 is a diagram of a semantic web interoperability architecture 100, according to one embodiment. The semantic web interoperability architecture 100 includes three layers: a use case layer 101, an ontology layer 103, and an application layer 105. In this embodiment, three use cases A, B, & C are listed as an example. Each of the user cases has its own application A, B, or C to run its own operations based upon the respective ontology A, B, or C defined therein. An application may be a plug-in or a full application. An ontology usually captures a shared understanding of a domain of interest, and provides a formal and machine manipulable model. An ontology includes a vocabulary used to describe a view of the domain of interest, an explicit specification of the intended meaning of the vocabulary, classification based information, and constraints capturing background knowledge about the domain. Given key role of ontologies in many applications, it is essential to provide tools and services to enable users to design and maintain meaningful (e.g., all named classes can have instances) and correct ontologies.

By way of example, the use case A provides a product list, the use case B provides a product reviews/feedback blog, and the user case C supports emails (to friends). Each of the use cases corresponds to a respective ontology A, B, or C: a store ontology, a social networking ontology, and an email ontology. In this example, the three applications include a store application, a social networking application, and an email application. The store application defines the store ontology for representing/displaying the product list to a user. On a product list screen, the user can select a product, get more details about the product, and orders the product. The social networking application uses the social networking ontology to support the blog, feeds, etc. The email application can use the email ontology to send a friend an email, e.g., about the product list and/or the product.

The conventional approach of building a mash-up has to change the code of the application A, e.g., the store application. By way of example, a "product details" page of the store application and the code handling its events are modified in order to adding therein new links, such as "Share via Email", "See Reviews," "Leave Feedback", etc. In other words, the designer of the application A has to identify each one of the use cases A, B, and C (e.g., the product list, the product reviews/feedback blog 109, etc.), resolve the dependencies of the application A with other applications B, C, etc., and make the required calls of the applications. For example, the store application is designed to call an email plug-in to display an email composition form. The store application is also designed to prompt the user to select one or more email recipients (e.g., by using another plug-in such as an address book plug-in), write the email body, attach file(s) to the email, and send the email to the recipients.

Although the social network ontology and the email ontology can introduce additional entities that enable linking of the product list thereto, the store application cannot take advantage of these links without modifying its code.

There is another conventional approach for integrating applications. The existing web applications, such as a generic search engine bar, often enable pre-defined integration points to be used to link the main application with another application. The pre-defined integration points are usually offered by the other application when a part/fragment of the other application is exposed and documented for someone to modify its code. When the main application runs, it just includes the part/fragment of the other application into the main application's user interface. Since the integration points need to be pre-defined, this approach is not very different from modifying the code of the main application based upon foreseen use cases. In addition, the integration point approach is not very reliable.

There is another conventional integration approach. A media player usually identifies a type of an incoming media stream, and then uses a common codec library to fetch the codec for the type. The media player feeds the media stream into the fetched codec and plays the output. In addition, the media player supports various plug-ins that process the data before it is played and/or visualized. This approach is specific to one use case: a media player, and it only statically integrates the data layer and the user interface layer.

Figure 2:
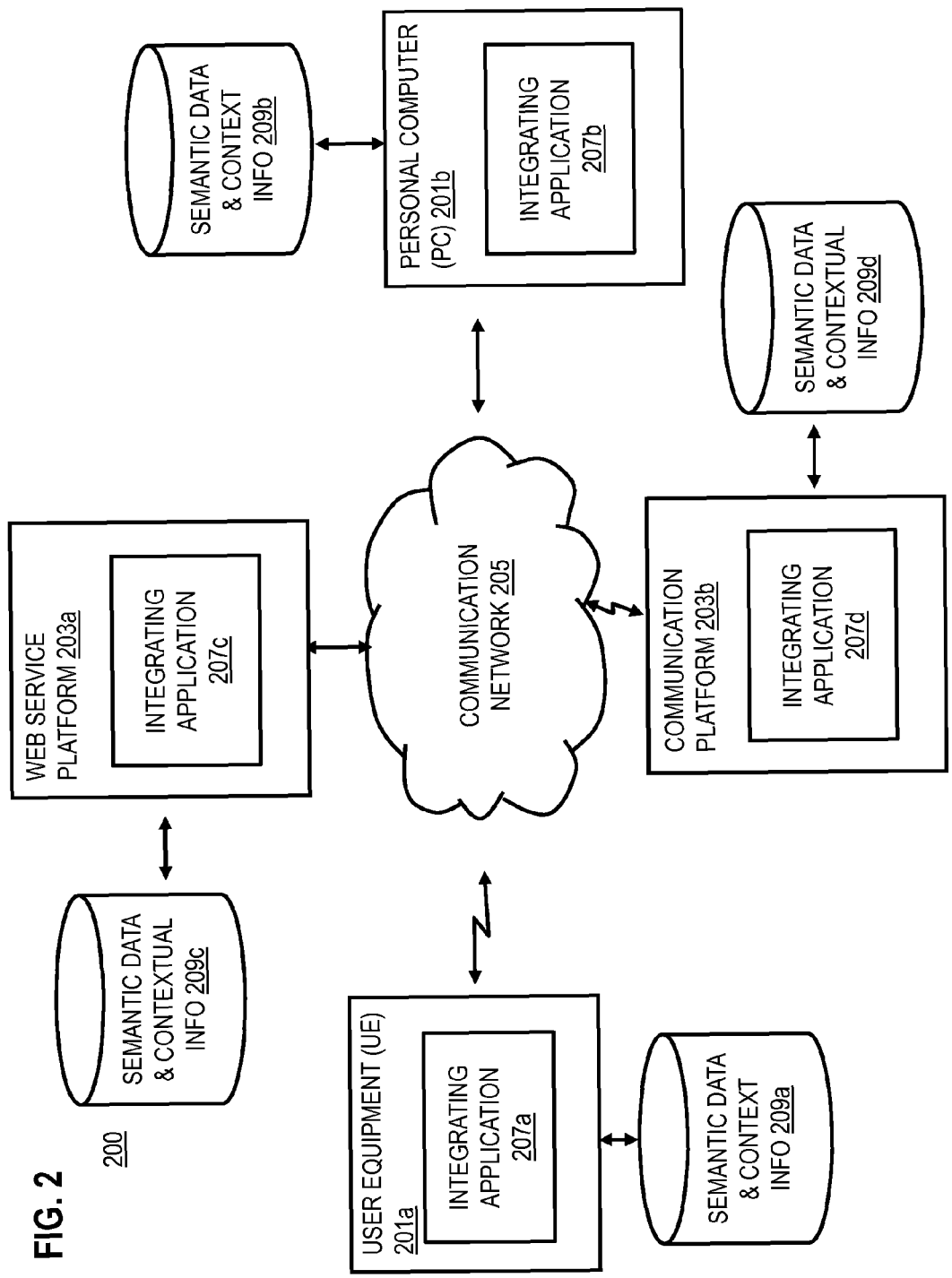
FIG. 2 is a diagram of a system capable of integrating applications on demand to display and manipulate a semantic resource, according to one embodiment.

To address these problems, an integrating application is designed to integrate applications (e.g., plug-ins, full applications, etc.) into a main application on demand (e.g., on the fly) to access a semantic resource. FIG. 2 is a diagram of a system capable of integrating applications on demand to display and manipulate a semantic resource, according to one embodiment. An integrating application enables the main application to visualize a part data linked into its data model that it does not understand, e.g., having unknown links and/or properties that are not yet defined in the ontology of the main application. In other words, the integrating application renders the unknown links and properties of the linked semantic data to the main application. The integrating application also enables the other applications and/or plug-ins to attach the visual data and metadata to its own semantic graph. The integrating application further enables establishing new integration points between the semantic applications without modifying the applications. The integrating application makes the semantic applications become more data-driven.

As shown in FIG. 2, the system 200 comprises a user equipment (UE) 201a connected to a personal computer 201b, a web service platform 203a, and a communication platform 203b via a communication network 205. Each of the UE 201a, the personal computer 201b, the web service platform 203a and the communication platform 203b has an integrating application 207 and a database 209 for storing information. The web service platform 203a and the communication platform 203b may provide services such as online shopping, music service, mapping service, video service, social networking service, content broadcasting service, etc. In particular, UE 201a and the personal computer 201b respectively have databases 209a and 209b for storing semantic data and contextual information. The web service platform 203a and the communication platform 203b respectively have databases 209c and 209d for storing semantic data and contextual information.

The user equipment (UE) 201 can exchange semantic data and contextual information with external databases using an integrating application 207a via the communication network 205. For the sake of simplicity, FIG. 2 depicts only a single UE 201 and a personal computer 201b in the system 200. However, it is contemplated that the system 200 may support any number of user terminals up to the maximum capacity of the communication network 205. For example, the network capacity may be determined based on available bandwidth, available connection points, and/or the like. As described previously with respect to the system 200, the integrating application 207a uses the ontology and contextual information to automatically discover properties of integration points and functional icons to present at the UE 201. In the example of FIG. 1, the integrating application 207a stores in the database 209a ontology data for different use cases and the corresponding applications of products, email, social network, etc.

By way of example, the user equipment 201 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 201 can support any type of interface to the user (such as "wearable" circuitry, etc.). Under this scenario, the UE 201 employs wireless links (e.g., cellular radio links) to access the communication network 205 and/or the integrating application 207a. In addition or alternatively, it is contemplated that the UE 201 may also employ wired connections (e.g., wired Ethernet connections) to the network 205 and/or the integrating application 207a. It is also contemplated that the UEs 201a, 201b can support any type of interface to the user (such as "wearable" circuitry, etc.).

Additionally, in certain embodiments, the communication network 205 of system 200 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UE 201a, the personal computer 201b, the web service platform 203a and the communication platform 203b communicate with each other and other components of the communication network 205 using well known, new or still developing protocols. In this context, a protocol includes a set of rules defining how the network nodes within the communication network 205 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the integrating application 207a of the UE 201a and the integrating application 207c of the web service platform 203a may interact with each other according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 3:
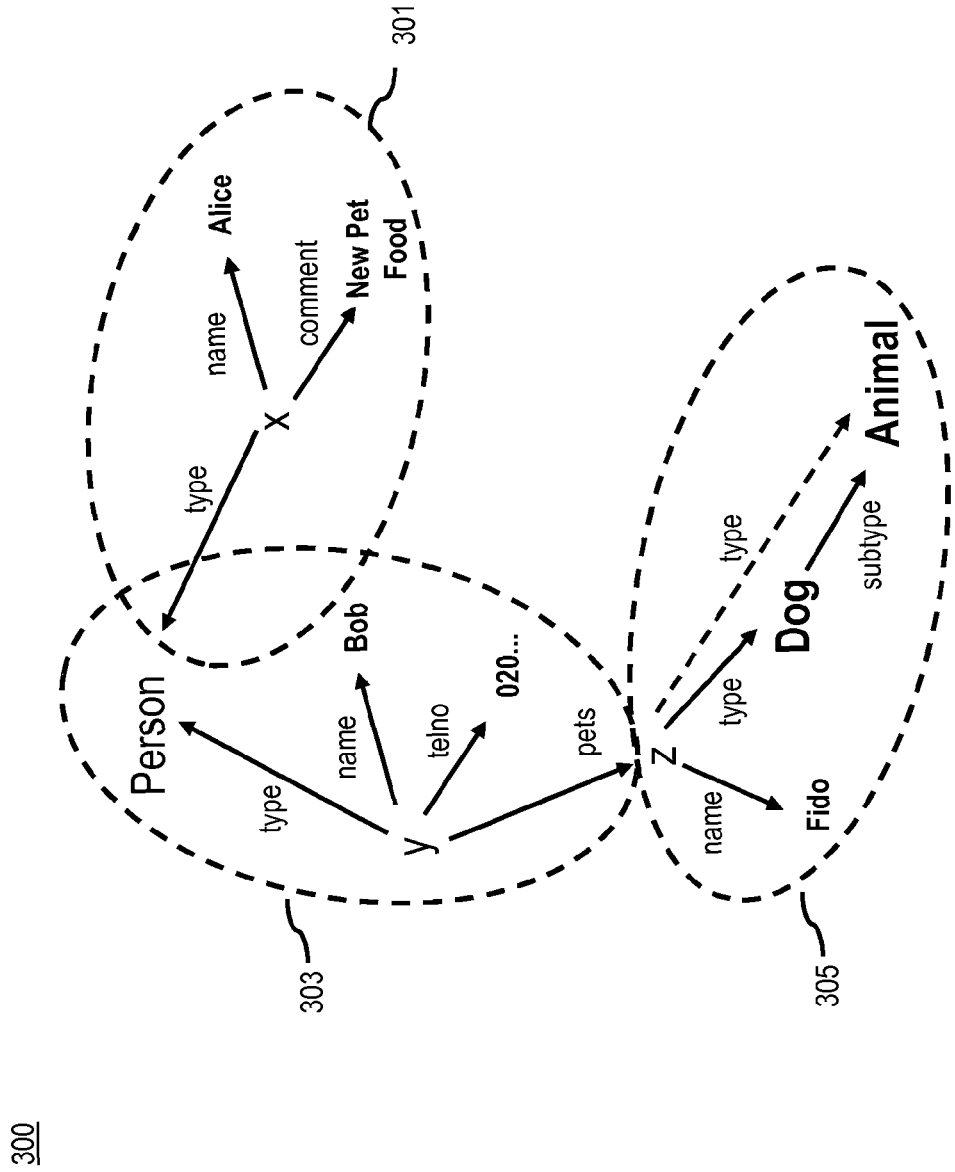
FIG. 3 is an example of a resource description framework (RDF) graph, according to one embodiment.

FIG. 3 is an example of a RDF graph 300, according to one embodiment. The RDF graph includes (1) nodes (objects, vertices, etc.) representing the entities (concepts, etc.), and (2) edges (links) representing the relationships. This RDF graph 300 contains three information subgraphs: One subgraph 101 of information regarding a person is represented by a uniform resource identifier (URI) "x," and shown within an oval in a broken line on the top right of FIG. 3. The subgraph 301 contains "Person" as the type information, "Alice" as the name information, and "New pet food . . . " as the comment information. Another subgraph 303 of information regarding a person is represented by a URI "y," and shown within an oval in a broken line on the left of FIG. 3. The subgraph 303 contains "Person" as the type information, "Bob" as the name information, and "020 . . . " as the telephone number information. A third subgraph 305 of information regarding a pet is represented by a URI "z," and shown within an oval in a broken line on the bottom of FIG. 3. The third subgraph 305 contains "Animal" or "Dog" as the type information, "Fido" as the name information, "Animal" as the subtype information, and "y" as the owner information.

By way of example, Bob wants to buy pet food for his puppy Fido and finds a new pet food product on the product list, and Bob searches and finds Alice's comments on the new pet food product posted in her blog. Since Bob's graph is already connected to Alice's graph via a social network and pre-approved to access Alice's graph (e.g., including Alice's comments on the new pet food product posted in her blog), Bob can read Alice's comments on the new pet food product to see if it is suitable for Fido. The contents of some part of Alice's graph may be static, such as age, race, etc., and the other part may be dynamic, such as bank account balance, contact lists, etc. In addition, the accessible scope of Alice's graph is subject to different levels of privacy control such that some details (e.g., age) are available only for certain people.

When Bob wants to send an email regarding Alice's comments to another user Jenna, since this is a new request by Bob, there is no pre-conceived use case in the store application for it to mesh-up the email application with the store application. An integration application of the store application integrates an email plug-ins of the email application into the store application on demand to access a semantic resource (e.g., Jenna's email address) to send out the email.

A semantic model is a set of machine-interpretable representations used to model an area of knowledge or some part of the world, including software. By way of example, a semantic model includes ontology that embodies some community agreement, logic-based representations, etc. Depending upon the framework or language used for modeling, different terminologies exist for denoting the building blocks of the semantic model. In one embodiment, basic ontology elements include classes, relations, functions, instances, etc. A semantic model consists, for instance, of entity classes, representing kinds of things of significance in the domain, and relationships assertions about associations between pairs of entity classes. A semantic model may also specify facts or propositions that can be expressed using the model. The semantic model is different from the traditional (relational) model, and can be extended. Accordingly, the model supports backward/future compatibility, for instance, via use of compatible ontologies to specify meaning of semantic annotations to web resources, enabling forming new terms by combining existing ones and combining terms in multiple ontologies. Data from multiple domains can be easily linked providing they have common points/nodes (people, places, items, locations . . . ). The semantic model supports graph-oriented query language(s) (e.g., SPARQL) suitable for making complicated multi-level queries, such as "find me animals of all my friends that are mammals and have fur."

In one embodiment, RDF query languages, such as SPARQL Protocol and RDF Query Language (SPARQL), were set with a mechanism for locally defining RDF graphs or subgraphs. These subgraphs or scopes may be embedded into the RDF query language and are defined explicitly in the form of RDF query language when the query is written. In another embodiment, a new RDF parameter type and macros (e.g., sets of commands) are used to manage RDF graphs representing queries in order to dynamically change queries and update query results in the semantic web. Although various embodiments are described here with respect to SPARQL, it is contemplated that the embodiments described in this application may be used with other RDF query languages such as WQL, DQL, N3QL, R-DEVICE, RDFQ, RDQ, RDQL, RQL/RVL, SeRQL, Versa, XUL, Adenine, etc.

Figure 4:
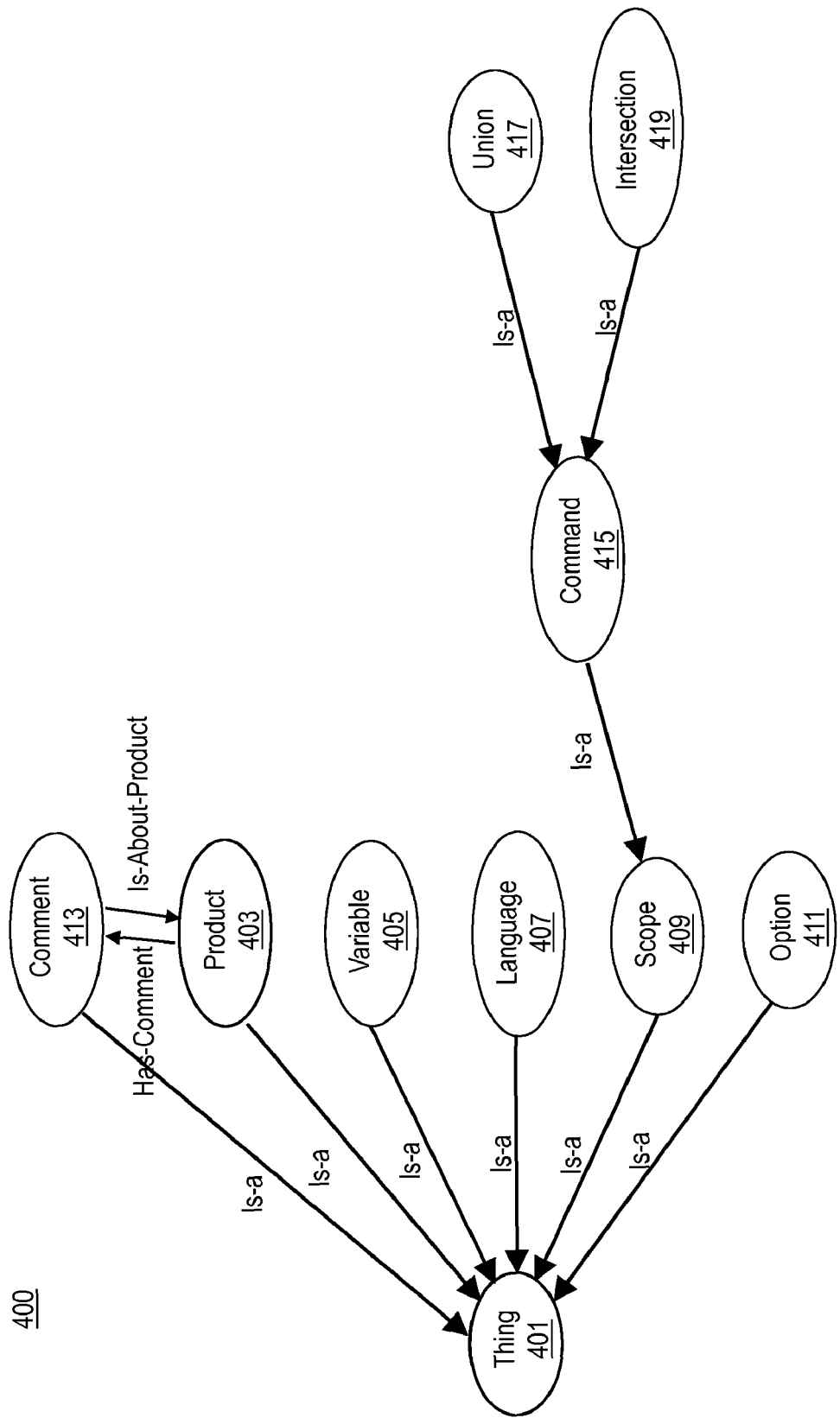
FIG. 4 is a diagram of RDF classes according to one embodiment.

FIG. 4 is a diagram 400 of expanded RDF classes according to one embodiment. In this embodiment, a new class "Comment" (e.g., comment 413) is linked to a class "Product" (e.g., product 403) with a relationship (e.g., "is-About-Product") in the social network ontology so as to enable users to post a comment to a product as an RDF subgraph. In another embodiment, a new property is added to the Product class that links it to the Comment class with a relationship (e.g., "has-Comment"). The incorporation of a comment class into the RDF class structure also enables query for a product comment as well as automatically updates to the corresponding comments with minimal or no user intervention. A "class" is an abstract type of object. An "object" is a "thing" 401 in a user's perceptual experience that is instantiated in markup languages by one or more elements and converted into the object-oriented pattern by a user agent application. Objects are instances of classes, which define the general characteristics of object instances. A "variable" 405 is an object capable of changing. A "language" 407 is one kind of RDF query language.

A "scope" 409 is the context within which a statement of a comment is valid. All scopes have a name which is specified as string type, nominally: xsd:string. An "option" 411 is a selectable object in a select list. Options are left freeform and behave like a compiler directive such as #pragma in the programming language Ada. A "command" 415 is a given instruction. A "union" 417 of two or more classes includes the members of all those classes combined, and an "intersection" 419 of two or more classes includes the members that belong to every one of the classes. The "union" 417 of two (or more) classes constitutes a new class and the "intersection" 419 also constitutes a new class. The descriptions further define a tree structure in FIG. 4 by specifying subclasses of the classes. For example, Comment 413 is subclasses of Product 403 and Intersection 419 is a subclass of Command 415.

Specific properties of the classes in FIG. 4 are expandable. A "property" is an attribute that is essential to the nature of a given object. Properties mainly provide limitations on objects from the most general case implied by roles without properties applied. The descriptions define (1) object properties, such as "Product", "Option", "Scope", "Variable", etc.; and (2) data type properties: "Comment," "Command," etc.

Figure 5:
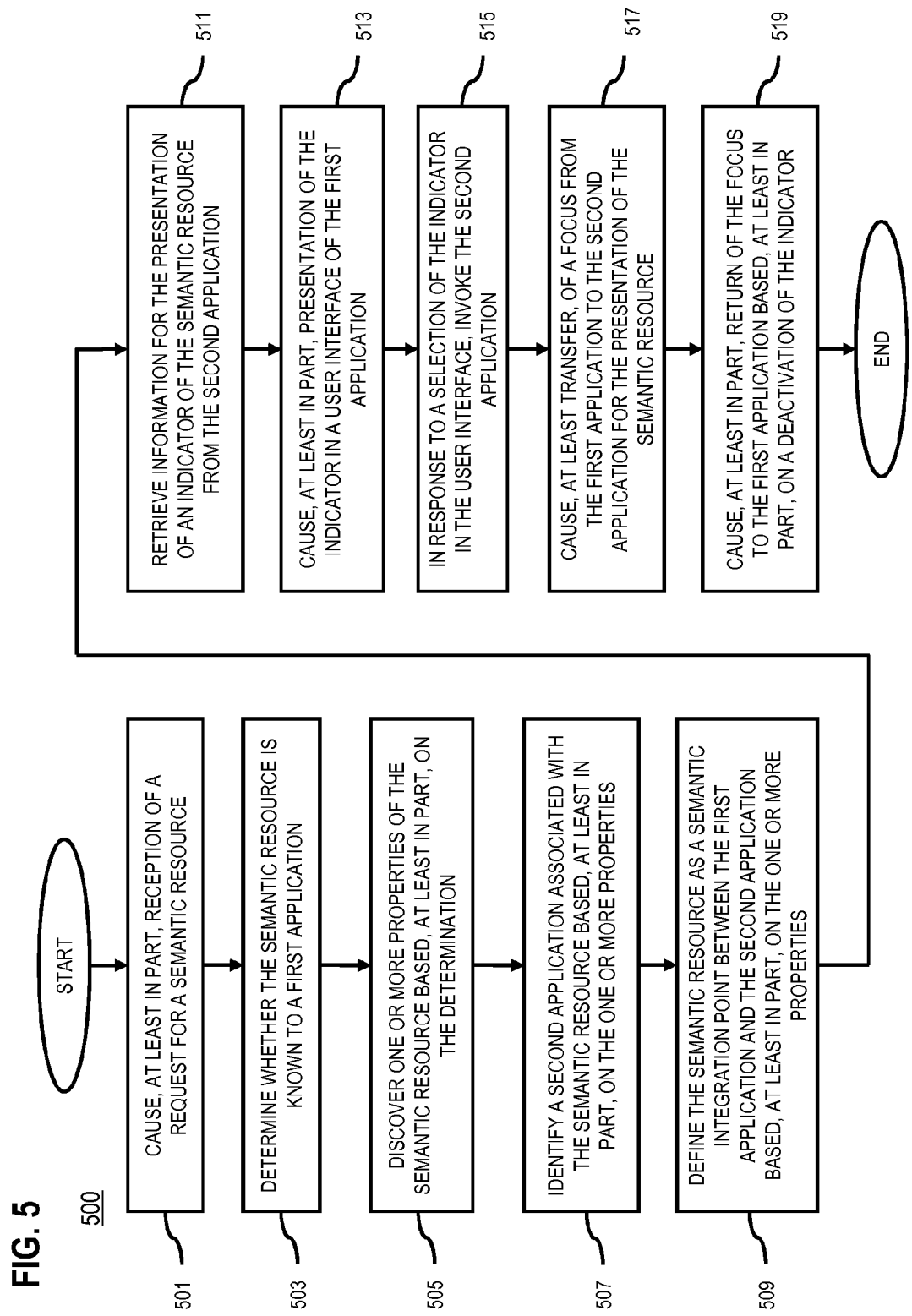
FIG. 5 is a flowchart of a process for integrating applications on demand to display and manipulate a semantic resource, according to one embodiment.

FIG. 5 is a flowchart of a process 500 for integrating applications on demand to display and manipulate a semantic resource, according to one embodiment. In one embodiment, the integrating application (e.g., the integrating application 207a) associated with a first application (e.g., the store application) performs the process 500 and is implemented in, for instance, a chip set including a processor and a memory as shown FIG. 14. In step 501, the integrating application 207a causes, at least in part, reception of a request for a semantic resource (e.g., information of a new product, blog, multimedia game, conference call, etc.). In one embodiment, the integrating application 207a is a module within the store application. The integrating application 207a is physically stored locally, for example, at the UE 201a, the PC 201b, the database 209a, etc.

In another embodiment, the integrating application 207a is a module external to the store application to be called by the store application or triggered by certain events. By way of example, the integrating application 207a is triggered whenever the user requests one or more external applications, or whenever the user requests/queries for information not available locally. The integrating application 207a may be physically stored locally or externally. For example, integrating application 207a is stored in the cloud, such as the databases of the web service platform 203a and the communication platform 203b, to be provided on demand. In other words, the integrating application can be provided via the cloud computing infrastructure consists of reliable services delivered through data centers and built on servers.

The integrating application 207a determines whether the semantic resource is known to a first application, e.g., the store application (Step 503). The determination may be based on the ontology associated with the first application as retrieved from a local and/or external semantic database.

The integrating application 207a discovers one or more properties of the semantic resource based, at least in part, on the determination (Step 505). By way of example, the integrating application 207a examines the RDF graph of the semantic resource, and compares its elements (e.g., properties, links, etc.) with the elements defined in the ontology to determine if the semantic resource is known to the store application. In one embodiment, the integrating application 207a establishes a semantic link from the first application to the semantic resource to discover the one or more properties of the semantic resource. The integrating application 207a then identifies the link by comparing a uniform resource identifier of the link against one or more known uniform resource identifiers, by examining metadata associated with the link, or a combination thereof. In another embodiment, the integrating application 207*a* queries the semantic database for the one or more properties of the semantic resource.

Thereafter, the integrating application 207*a* identifies a second application (e.g., a social network application controlling a consumer review blog mentioning the product) associated with the semantic resource (e.g., a new product) based, at least in part, on the one or more properties, e.g., a price, manufacturer, color, size, available quantity, etc. (Step 507). As another example, when the one or more properties include a stock price, company name, available quantity, etc., the integrating application 207*a* identifies a stock brokerage application as the second application, to provide access to online trading, stock quotes and stock market research, etc.

The integrating application 207*a* defines the semantic resource as a semantic integration point between the first application and the second application based, at least in part, on the one or more properties (Step 509). The integrating application 207*a* retrieves information for the presentation of an indicator of the semantic resource from the second application (Step 511). The indicator can be any kinds of visual representation, such as an icon, tab, button, pop-up, animation, avatar, drop-down, screen, etc., or a combination thereof. The information may include a hypertext markup language fragment, a cascading style sheet resource, a hint, an additional menu item, a reference to a public semantic resource, or a combination thereof.

The integrating application 207*a* causes, at least in part, presentation of the indicator in a user interface of the first application (Step 513). Multiple types of indicators (e.g., an icon, tab, button, pop-up, etc.) are available. The integrating application 207*a* freely chooses the most appropriate indicator type. By way of example, the integration application 207*a* prefers a button on one platform and a tab on another platform on the same screen.

The integrating application 207*a*, in response to a selection of the indicator in the user interface, invokes the second application (Step 515). One or more second applications can be invoked via the first application. In addition, one or more third applications can be invoked via a second application. As results, multiple layers of applications are invoked with multiple applications in each layer. When one application requires user input or focus, it will either pop-up over the existing application window(s), or its icon will flash.

In one embodiment, the integrating application 207*a* causes, at least transfer, of a focus (including context, i.e., the actual location in the semantic graph) from the first application to the second application for the presentation of the semantic resource (Step 517). The integrating application 207*a* causes, at least in part, return of the focus to the first application based, at least in part, on a deactivation of the indicator (Step 519). In another embodiment, the integrating application 207*a* enables multiple applications in one layer share the focus. In another embodiment, the integrating application 207*a* enables multiple applications in respective layers share the focus.

Although various embodiments are described with respect to the integrating application 207*a* associated with the first application, it is contemplated that there is a corresponding integrating application associated with the second application to interact with the integrating application 207*a* associated with the first application to carry out the above-described results. By way of example, the integrating application of the second application is invoked by the integrating application 207*a* associated with the first application, in response to a selection of the indicator in the user interface. The integrating application of the second application also interacts with the integrating application 207*a* associated with the first application to transfer the focus therebetween.

In another embodiment, the integrating application of the second application is merged with the integrating application 207*a* associated with the first application into one integrating application such that the merged application can call the second application into the first application and/or to be called into a first application. In yet another embodiment, the merged application can call multiple second applications into the first application, and/or to be called into multiple first applications.

The approach described herein may be applied in any other use cases in the semantic web. Examples of other use cases may include teleconferencing, distance learning, telemedicine, online banking, content sharing, online job hunting, online games, gambling & lotteries, online applications/filing for driver's licenses, tax returns, zoning permits, schools, jobs, credit cards, etc.

Figure 6:
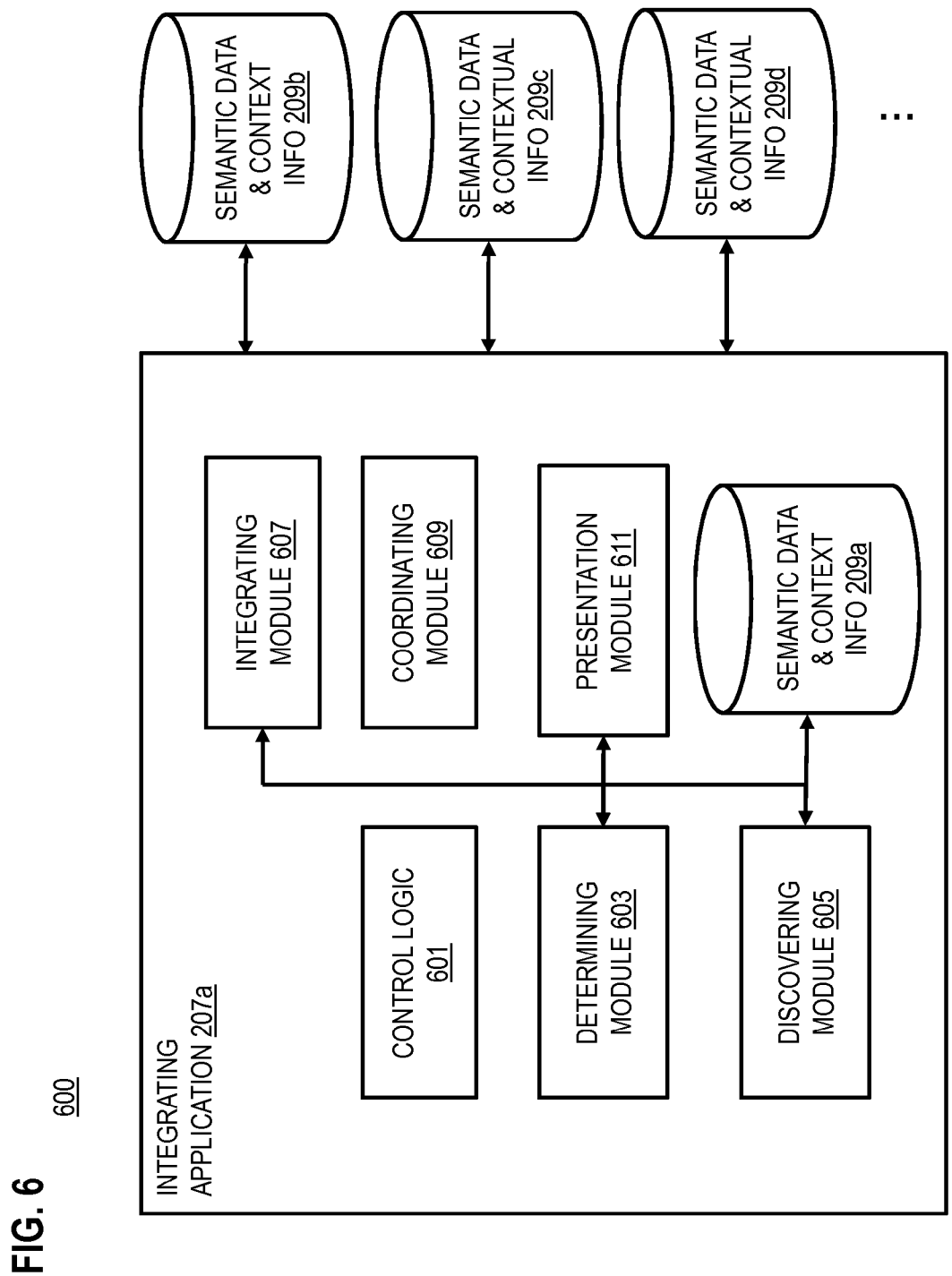
FIG. 6 is a diagram of the components of an integrating application, according to one embodiment.

FIG. 6 is a diagram 600 of the components of an integrating application, according to one embodiment. By way of example, the integrating application 207*a* of the UE 201*a* includes one or more components for integrating applications on demand to display and manipulate a semantic resource. It is contemplated that the functions of these components may be combined in one or more components or performed by other components of equivalent functionality. In this embodiment, the integrating application 207*a* includes at least a control logic 601 which executes at least one algorithm for performing functions of the integrating application 207*a*. For example, the control logic 601 interacts with a determining module 603 to determine whether the semantic resource is known to a first application, for example, by reviewing the relevant RDF graph.

The control logic 601 also interacts with a discovering module 605 to discover one or more properties of the semantic resource based, at least in part, on the determination. In one embodiment, the discovering module 605 investigates the semantic resource directly. In another embodiment, the discovering module 605 queries its own database 209*a*, and/or one or more external databases for the properties of the semantic resource. In certain embodiments, the integrating application 207*a* of the UE 201 interacts with the integrating application 207*c* of the web service platform 203*a* to retrieve the addition data for the discovering module 605.

The control logic 601 also interacts with an integrating module 607 to define the semantic resource as a semantic integration point between the first application and the second application based, at least in part, on the one or more properties. In one embodiment, the integrating module 607 defines two integration points that correspond the same semantic resource to different applications (e.g., email application, social network application, etc.). In another embodiment, the integrating module 607 defines a combine integration points for the different applications integrated via the same semantic resource.

The control logic 601 also interacts with a coordinating module 609 to coordinate the focus of user interface on one of the applications. The coordinating module 609, in response to a selection of the indicator in the user interface, invokes the second application, and causes, at least transfer, of a focus from the first application to the second application for executing a user desired function (e.g., composing an email, browsing a product review, etc.). Once the user deactivate the indicator, the coordinating module 609 causing, at least in part, return of the focus to the first application. In another embodiment, when the user requests a function of a third application, the coordinating module 609 invokes the third application and transfers the focus accordingly. The user can freely switches among applications on demand, once their integration points are discovered and defined in the ontologies. There is no limitation on the number of active integration points and the number of invoked applications.

The control logic 601 also interacts with a presentation module 611 to render the indicator as well as the application focus of user interface. In some embodiments, an indicator is embedded with multimedia, such as music, sounds, images, 3D effect, etc. depending upon the semantic elements of the integration point. For example, a music piece embedded as background is chosen based upon the content of interest, activity, and other parameters of the integration point. By way of example, the indicator of an integration point of the new puppy food is embedded with the sound and image of a happy puppy. The image may contain the image of an owner, a veterinarian, a dog trainer, etc. The sound may contain the voice of an owner, a veterinarian, a dog trainer, etc.

Figure 7:
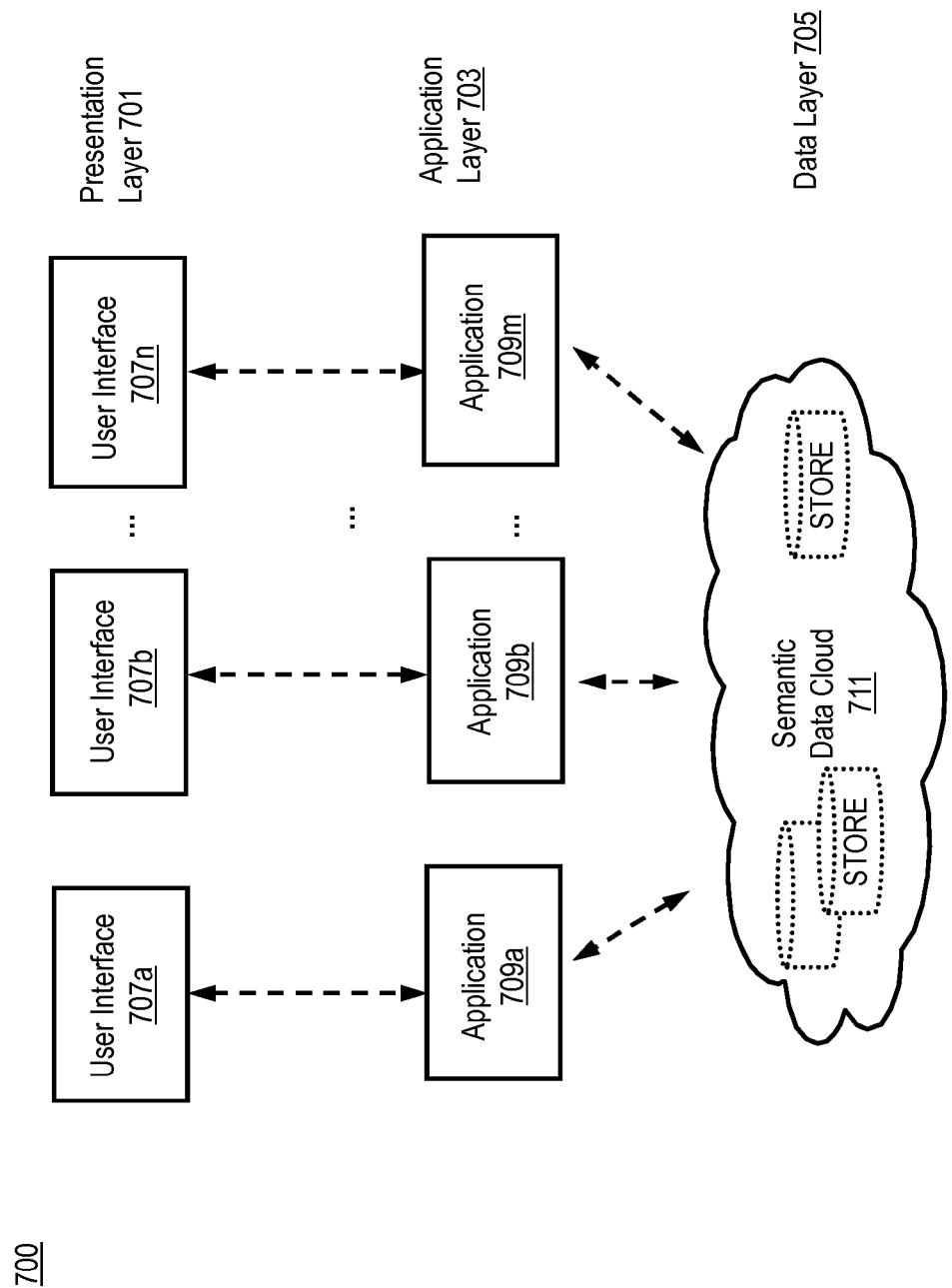
FIG. 7 is a diagram of a smart space interoperability architecture, according to one embodiment.

FIG. 7 is a diagram of a smart space interoperability architecture 700, according to one embodiment. A "smart space" refers to a plurality of information spaces of different entities in a "smart space architecture" that enables the entities and different semantic web tools to access heterogeneous information embedded in different semantic domains available for different semantic web tools as described herein. The smart spaces maintain privacy of personal information while enabling users to search over different ontology domains of different applications, different platforms, different equipment, and different vendors in the semantic web.

The smart space interoperability architecture 700 includes three layers: a presentation layer 701 implemented at a node level to support different user interfaces 707, an application layer 703 implemented at a semantic information broker (SIB) level to support different applications 709 (e.g., open source software) running on sharing computing platform, and a data layer 705 implemented at an information store level to exchange data among information stores in a semantic data cloud 711. Each of the applications 709 may have its own application domain ontology (e.g., emails, blogs, etc.), and a corresponding user interface presentation ontology (e.g., email management and presentation, etc.).

The domain ontology is a schema used for building an application. The domain ontology defines the ontology for the specific application domain (such as email). By way of example, the email domain ontology defines the data structures of a mailbox, email message, sender, recipient, etc. The domain ontology can be used by the semantic database to enforce the data structures. An application can be coded against a particular ontology in order to display and manipulate the domain data. The data in the semantic data cloud 711 are used based upon common data ontologies and use common data formats accessible by the applications 709. All data (including ontologies) may be represented in RDF graphs.

While the semantic web envisions a single, universal web of machine-understandable information, the smart space interoperability architecture 700 organizes the machine-machine communication by setting up in distinct spots (e.g., information stores, etc.) of information exchange. At each spot, a number of applications 709a, 709b, . . . , 709m executing in potentially many device nodes of potentially many kinds may publish and read semantic information. This information may not be prepared in machine readable form. The semantic information can be adapted to different applications that process different information composed for given topics based on user profiles and preferences.

In another embodiment, each semantic data model is prepared explicitly for each particular use case. Any particular use case has a particular purpose or focus. In other words, the information made available by a particular use case is dedicated to the particular purpose or focus of that use case. The number of applications exchanging information for a particular use case is consequently limited to those that share this dedication.

In the existing hypertext internet interoperability architecture, the implementation of a data structure usually requires writing a set of procedures that create and manipulate instances of that structure. The data structure is defined indirectly by the operations that may be performed on it, and the mathematical properties of those operations (including their space and time cost). The efficiency of a data structure is analyzed together with those operations. Many files on a typical computer can be loosely divided into documents and data. Documents like mail messages, reports, and brochures are human-readable. Data, like calendars, address books, playlists, and spreadsheets are presented using an application program which lets them be viewed, searched and combined.

In the smart space interoperability architecture 700, all data is represented semantically, e.g., in languages specifically designed for data. The semantic web has classes with attributes and the concept of instances or objects. Its data layer 705 provides information stores, user profiles, and rules databases of different data models defined semantically. The semantic data stores correspond to the semantic representation of content data, application data, etc. A user profile stores user background, user preferences, user context, etc. The rules database stores the set of rules linking user profiles to the content data, user interfaces, and topics in the applications. Application data, their relationships, user profiles, and rules can be stored using any relational databases or RDF graphs.

In the smart space interoperability architecture 700, SIBs, agents and the nodes handle different applications 709a, 709b . . . 709m that assume various functions shared by or tailored for different service applications, such as rule interpreters, adaptive engines, etc. A significant difference between hypertext internet applications and semantic web applications is that the data representation in a semantic web application is semantically defined rather than just logical. The rules interpreter reads the rules stored in the data layer 705 and triggers them based on the user profiles, etc. The adaptive engines adapt the presentation and navigation based on the user profiles, as well as the status of the user in the application. In the smart space, use cases are considered in which a set of agents executing in various nodes mash-up the information that these agents store and retrieve in/from a particular SIB. This collaboration of the agents forms the application, while collaboration and mash-up of information occurs depends on the data available.

Applications are constructed to be executed by the agents and SIBs in a collaborating manner through information sharing, rather than in the monolithic manner as in the hypertext internet interoperability architecture. Depending upon the particular situation and context that the user is either experiencing or requires at that time, the agents can provide a monolithic style user-interface at the presentation layer 701.

In the smart space interoperability architecture 700, the user interfaces 707 reside in the nodes. In another embodiment, the presentation layer 701 can also provide different user interfaces 707a, 707b, . . . 707n adapted for different presentation and navigation. A user interface in a semantic web application is flexible enough to compose a web page based on the available presentation and navigational elements instead of a fixed page design as in hypertext internet applications. Adaptive presentation adapts the contents of the page based on the user profiles. Adaptive navigation adapts the navigational elements and scenarios based on the user profiles. An adaptive user interface with adaptive presentation and adaptive navigation can be implemented using a user interface framework such as Websphere Portal, JSF, Tapestry, etc. providing capabilities to adapt the contents of the user interface to different users in various use cases, such as email, blog, etc.

Figure 8:
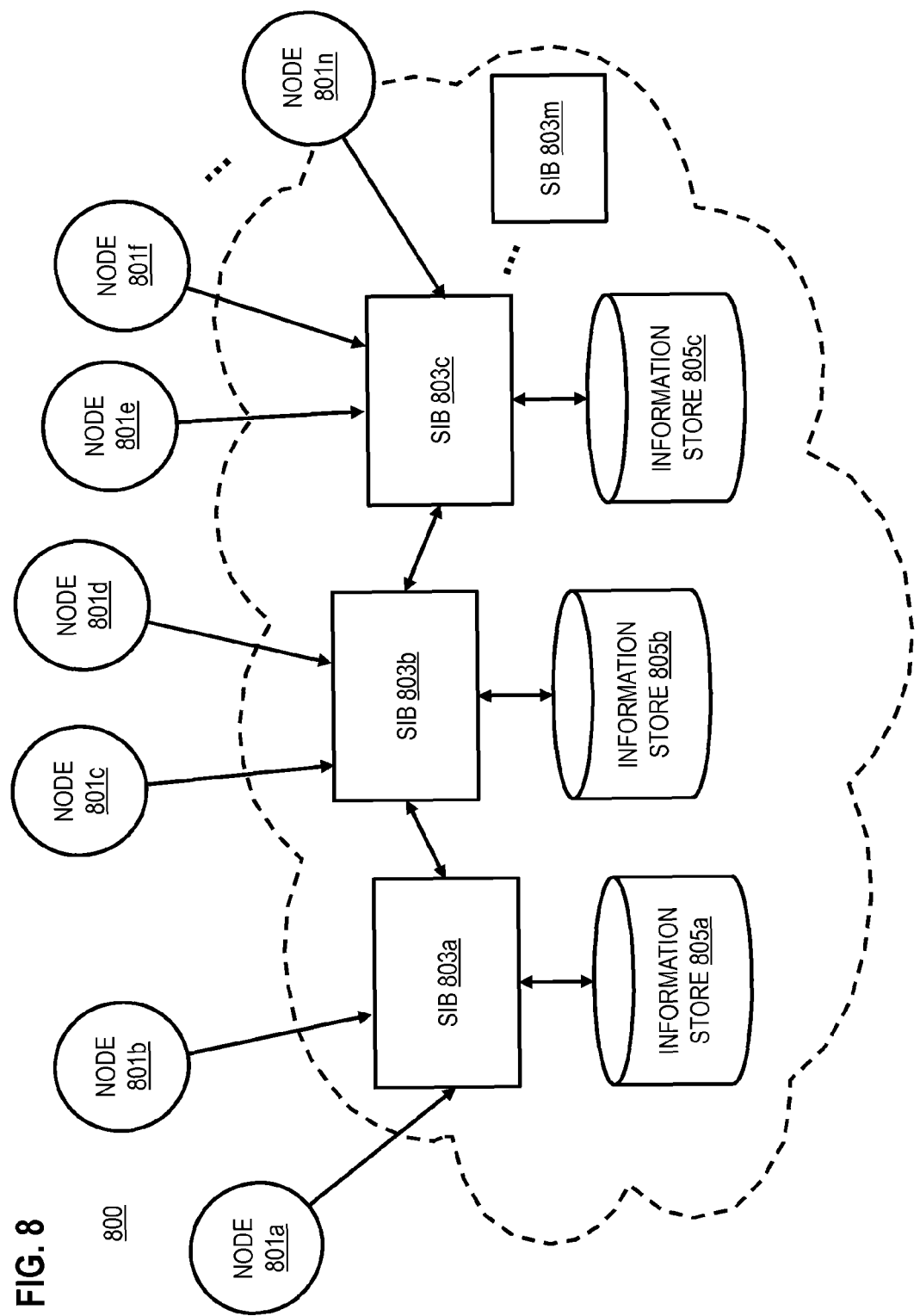
FIG. 8 is a diagram of a smart space logical architecture, according to one embodiment.

FIG. 8 is a diagram of a smart space logical architecture, according to one embodiment. As mentioned, the smart space architecture (an entity focused structure) is developed such that a user can encapsulate all of personal information and interact with the information in the smart space according to the user's individual semantics and needs. The user can be a person, an organization, or other entity. Nodes 801 (including a user terminal node 801a) are provided in the smart space 800 as dynamic query resolution agencies which carry at least functions of the user agent application as discussed in the semantic web. Semantic information brokers (SIB) 803 are provided in the smart space 800 as entities performing information transaction operations. Local SIBs carry at least functions of the RDF cache or the cache manger while remote SIBs carry at least functions of the external databases.

An individual smart space 800 of the user is aggregated information set with information from different sources related to the user. For example, sources of the user's personal information, family information, work information, social network information, etc. Includes include (1) government records and databases, (2) employer databases; (3) credit card companies, banks, credit bureau database; (4) marketing survey and data mining databases, (5) user online behavior databases (browsing by a user via Internet, information mentioned by the user in the user's e-mails, calendar appointments, etc, (6) media items (articles, music, video, photos, etc. posted in blogs on web pages, etc.) created by the user, (7) articles, music, video, photos, etc. captured by the user, etc. These information contents are private and remain segregated from other information in the semantic web to protect the user's privacy. Only authenticated and authorized nodes, such as a credit card company, a bank, a trusted party, etc. of the user, are enabled to access the user's personal smart space to share the information such as the user's financial information, payment transactions, etc. stored in a local SIB (e.g., which may reside in the node 801a). It is up to each user to define what is available for whom. With the authorization proxy, the user does not have to predefine an access policy applicable to particular individuals and/or applicable to everyone. Rather, the user can decide when a requester asks for authorization.

As seen in FIG. 8, each smart space is distributed across at least one set of nodes belonging to at least one user. In this embodiment, the smart space 800 is distributed across multiple nodes 801a-801n that each belong to multiple users. For example, nodes 801a and 801b belong to a first user, while nodes 801c-801f belong to a second user. It is also contemplated that one or more of the nodes (e.g., node 801n) may belong to a centralized information provider. Nodes 801 are personal/individual in that they perform tasks either directly decided by the user or autonomously for or on behalf of the user. For example, the nodes 801 can monitor predetermined situations or reason/data-mine information available in the smart space 800.

By way of example, with the personal information, nodes of the credit card company and the bank can facilitate a purchase by the user via interacting with the user terminal node 801a, with minimum or even no user involvement. For example, when the user browses a website for flight tickets, a website node interacts with the user terminal node 801a to prompt the user to selecting tickets that fit the user's criteria. The user taps on the screen of the user terminal node 801a to select tickets, and then informs the website node to go ahead charging the user's credit card for the tickets, without asking the user to enter user financial data.

A node 801 may connect to one or more smart spaces 800 at a time. Moreover, the specific smart spaces 800 and to which the node 801 is connected may vary over the lifetime of a node. Mobility of nodes 801 is provided by moving links to the smart space 800 rather than moving a physical running process of the smart space 800. The node 801 can save its state and become 'mobile' when another node 801 restores that state. Nodes 801 themselves are anonymous and independent of each other—there is no explicit control flow between the nodes 801 other than that provided through preconditions to node actions. A coordination model based around expressing coordination structures as first-order entities and focusing on collecting reasoning and context. Control flow can be made outside of the smart space 800 through nodes 801 and the applications serving the nodes 801 explicitly sharing details of their external interfaces through the smart space 800. The responsibilities of nodes 801 range from user-interaction to reasoning and performing tasks such as truth maintenance, belief revision, information consistency management etc.

The nodes 801 access information in the smart space 800 through the SIBs 803a-803m by connecting to any of the SIBs 803 making up the smart space 800 by whatever connectivity mechanisms (e.g., connectivity over a data network, the Internet, etc.) the SIBs 803 offer. Usually, the connection is over some network (e.g., data network, wireless network, telephony network, service provider network, etc.), and the nodes 801 are running on various devices. For example, the node 801 may be supported on any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the device supporting the node 801 can support any type of interface to the user (such as "wearable" circuitry, etc.).

Additionally, a communication network (not shown) capable of supporting the smart space 800 can include one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

Each SIB 803 performs information transaction operations, possibly co-operating with other SIBs 803, for the smart space 800. In one embodiment, an SIB 803 may be a concrete or virtual entity. Each SIB 803 supports nodes 801 interacting with other SIBs 803 through information transaction operations. In this embodiment, the smart space 800 includes SIBs 803*a*-803*m* each connected to respective information stores 805*a*-805*c*. Each information store 805 of the smart space 800 stores the information of the nodes 801, and any other information available over the smart space 800. This can include, for example, information of a current state or activity of the node 801, observations of the outside information world, maintenance information, and the like. The smart space 800 applies a 'publish and read' mechanism at dedicated information stores 805*a*-805*c*. A publishing node does not need to be interoperable with the reading node. In fact the two even do not need to know about each other. The smart space 800 simply facilitates the publisher to publish at the selected information store and the reader node to read there.

Synchronization between these distributed, individual information stores 805 is asymmetric according to device and network capabilities as well as the user's needs in terms of security, privacy, etc. For example, private information about a user's family is stored at the user's home location where stricter information security policies can protect the information. The private information can then be augmented by non-private information at a website (e.g., a social networking website) without actually transferring the private information to the website. In this case, augmenting information is preferable to merging information due to, for instance, copyright and/or privacy concerns.

Interaction among smart spaces 800 is nominally conducted by the nodes 801 which encapsulate fine grained functionality to be distributed across any number of devices that have access to one or more of the smart spaces 800. The smart spaces 800 themselves can interact through merging and projection thereby enabling larger smart spaces 800 to be constructed either on a permanent or temporary basis. Moreover, the smart space 800 may be a personal space, a share/social space of at least two users, a group space, a public space of a community, a county, a state, or a county, etc., and the like. The aggregation of all smart spaces 800 constitutes the world of information (including the semantic web) which is also referred to as a smart space. A smart space 800 including the entire world of information also supports all services (including all platforms and vendors) available in the world, as well as all of the world's devices and equipment.

The smart space 800 is interoperable over different information domains, different service platforms, and different devices and equipment. For example, the smart space 800 accommodates transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. The smart space 800 also covers technologies used for discovering and using services, such as Bluetooth/human interface device (HID) services, web services, services certified by the Digital Living Network Alliance (DLNA), the Network on Terminal Architecture (NoTA), etc. The smart space constitutes an infrastructure that enables scalable producer-consumer transactions for information, and supports multiparts, multidevices and multivendors (M3), via a common representation of a set of concepts within a domain (such as a RDF domain) and the relationships between those concepts, i.e. ontologies. The smart space 800 as a logical architecture has no dependencies on any network architecture but it is implemented on top of practically any connectivity solution. Since there is no specific service level architecture in the smart space 800, the smart space 800 has no limitation in physical distance or transport. The smart space 800 architecture enables user devices purchased at different times and from different vendors to work together. For example, the user can listen/watch/etc. to music/movies/etc. wherever the user is using one personal device in the vicinity of high quality speakers or display. In addition, the smart space 800 architecture enables application developers to mash-up services in different domains, instead of trying to port an application to all platforms and configurations. The smart space architecture also enables device manufacturers to make interoperable products, so that consumers have no concern about compatibility of different products and accessories.

A smart space 800 transcends over many of the user's devices (e.g., mobile phones, media centers, personal computers, servers, routers, etc.) enabling the distribution of information and queries upon that information over any of the user's devices. For any node 801 accessing the information, the physical location of the node 801 and the location of the information are irrelevant, e.g., a node 801 sees the 'totality' of all information in that smart space 800. By way of example, the nodes 801 access the smart space 800 with basic operations including Insert (to insert information into a smart space), Remove (to remove information from a smart space), Update (to update information in a smart space, which is effectively an atomic remove and insert combination), Query (to query for information in a smart space), Subscribe (to set up a persistent query in a smart space such that a change in the query results is communicated to the subscribing node), other query management operations (e.g., notification, etc.) as discussed with respect to the query application 807*a*, etc. The nodes 801 communicate implicitly by inserting information to the smart space 800 and querying the information in the space 800.

Various embodiments are described herein with respect to query management in the smart space. By way of example, RDF is used in the smart space 800 to store information in information stores 805*a*-805*c*. RDF enables joining data in vocabularies from different business/ontology domains without having to negotiate structural differences between the vocabularies. In addition, via the RDF, the smart space 800 merges the information of the embedded domains with the information on the semantic web, as well as makes the vast reasoning and ontology theories, practices and tools developed by the semantic web community available for application development in the smart space 800. The smart space 800 also makes the heterogeneous information in embedded domains available to the semantic web tools.

As discussed, an ontology describes a domain, and a knowledge base based on an ontology describes particular state of affairs. In one embodiment, a formal specification is used to process ontologies and to operate on ontologies automatically. Each knowledge based system or agent has its own knowledge base, and only what can be expressed using an ontology can be stored and used in the knowledge base. When an agent wants to communicate to another agent, it uses the constructs from an ontology shared between the agents to understand the communicated information and maintain communication consistency.

Figure 9:
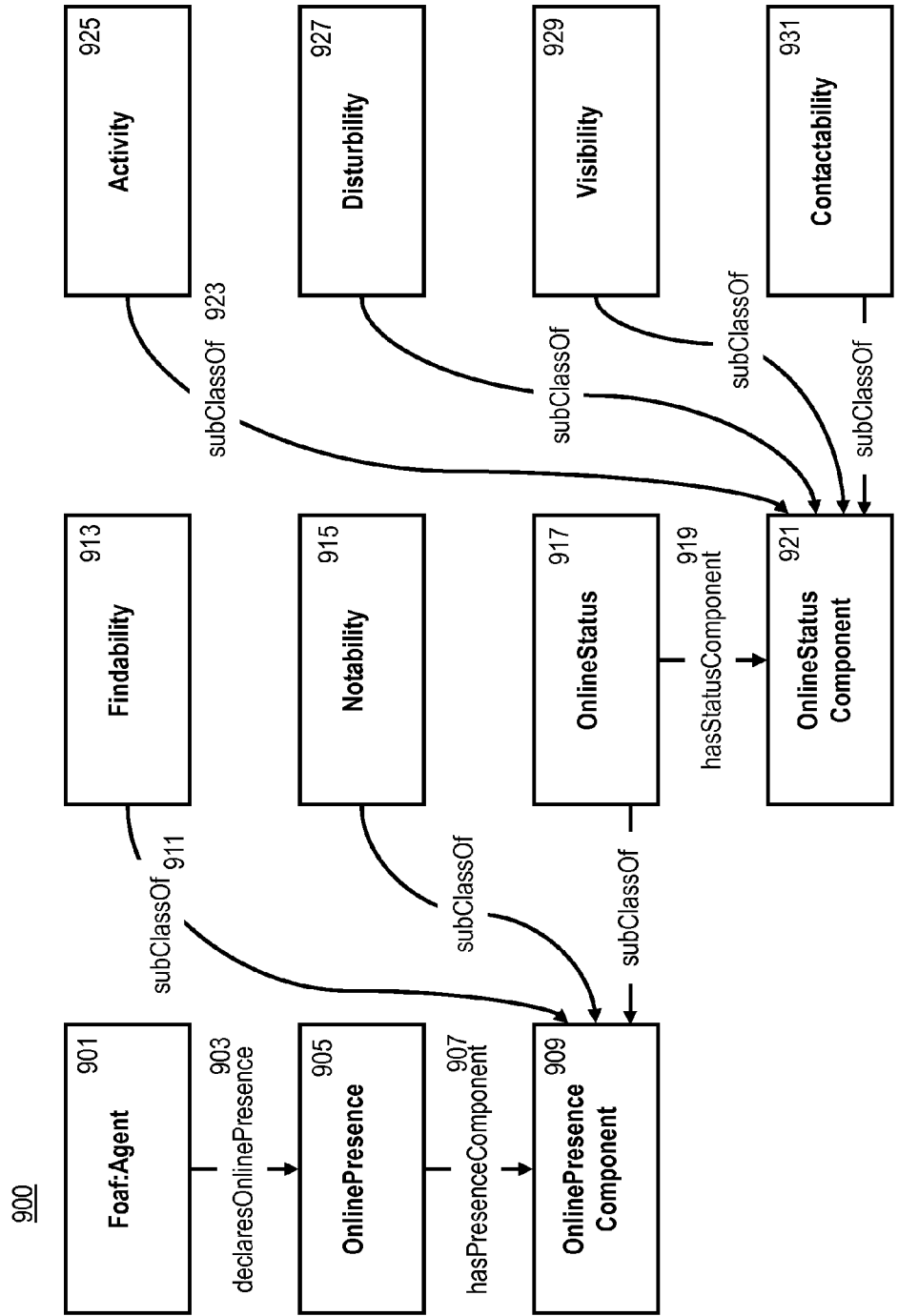
FIG. 9 is an example of a taxonomy of a social network ontology, according to one embodiment.

An ontology defines the vocabulary with which queries and assertions are exchanged among agents. The backbone of ontology is a taxonomy. Taxonomy is a classification of things in a hierarchical form. In one embodiment, the taxonomy is a tree or a lattice that express subsumption relation—e.g., A subsumes B meaning that everything that is in A is also in B. FIG. 9 shows an example of taxonomy 900 of social interactions, according to one embodiment. A social interaction refers to a relationship between two or more users (e.g., a social group). This social network service taxonomy 900 reflects social networks and/or relations among people, e.g., who share interests and/or activities. The taxonomy 900 starts with a class 901 of "a friend of a friend (FOAF): Agent", that has a relationship 903 of "declareOnlinePresence" with a class 905 of "OnlinePresence." The class 905 in turn has a relationship 907 of "hasPresenceComponent" with a class 909 of "OnlinePresenceComponent." The subclasses "Findability" 913, "Notifiability" 915, and "OnlineStatus" 917 has a relationship 911 of "subClassOf" with the class 909. The subclass 917 in turn has a relationship 919 of "hasStatusComponent" with a parallel subclass 921 of "OnlineStatusComponent." The secondary subclasses "Activity" 925, "Disturbability" 927, "Visibility" 929, and "Contactability" 931 has a relationship 923 of "subClassOf" with the subclass 921. The taxonomy 900 is applicable to all users in the social network ontology domain. A taxonomy of properties can be defined accordingly.

Ontologies are not limited to taxonomic hierarchies of classes or to definitions that only introduce terminology without adding knowledge to the domain. To specify a conceptualization, axioms that constrain the possible interpretations for the defined terms are also defined.

After an ontology is developed, it is used, reused, and related to other ontologies, such as the store ontology, the email ontology, etc. Once ontology is created for a domain, it is reusable for other applications in the same domain. In one embodiment, all ontology agent (OA) can participate in a communication about these tasks using a defined service ontology. In another embodiment, a dedicated ontology agent is available for ontology related services. The dedicated ontology agent provides some or all of the services: discovery of public ontologies in order to access them, help in selecting a shared ontology for communication, maintain (e.g. register, upload, download, and/or modify) a set of public ontologies, translate expressions between different ontologies and/or different content languages, respond to queries for relationships between terms or between ontologies, facilitate the identification of a shared ontology for communication between two agents.

Figure 10:
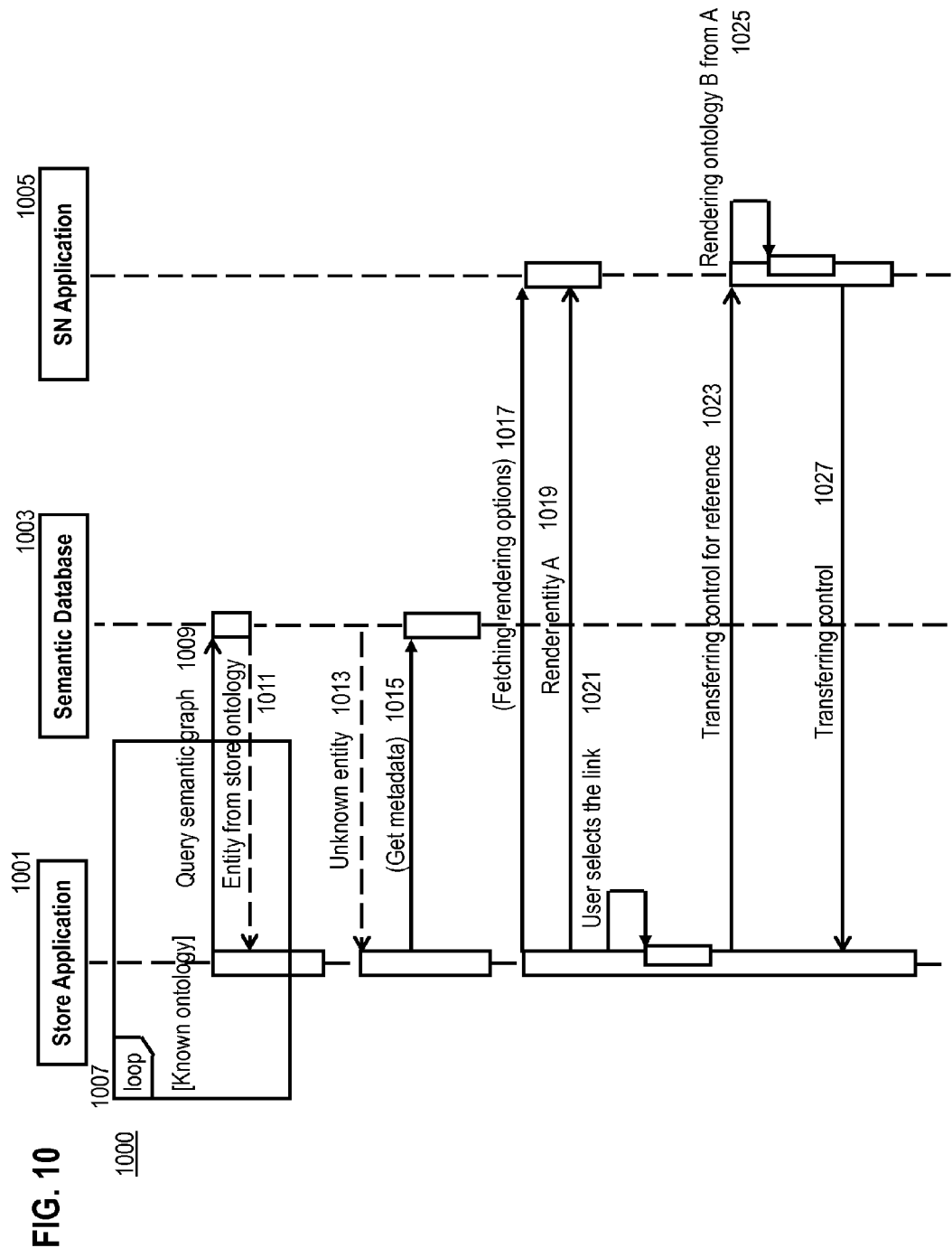
FIG. 10 is a diagram of an application integration call sequence, according to one embodiment.

FIG. 10 is a diagram of an application integration call sequence 1000, according to one embodiment. By way of example, the store application 1001 displays to a user information related to the store product category represented by a semantic graph (e.g., a RDF graph). In response to the user's request for information of a product unknown to the store application 1001, the store application 1001 queries a semantic database 1003 for the semantic graph corresponding to the requested product in a loop operation 1009. The semantic database 1003 may be local or external to the store application 1001. The store application 1001 follows the semantic database 1003 in an operation 1007, e.g., by sliding back and forth along the edges of the semantic graph. Eventually, the store application 1001 arrives at a product screen represented by a store node/entity according to the store ontology in an operation 1011.

To retrieve the product information, a link between the product node/entity and a blog node is set up between the store ontology and the social network (SN) ontology. By analogy, to share the product information by email, a new type of the link is introduced from the store ontology to the email ontology. This link introduction can be done either by the party responsible for the blog/email plug-in of the SN/email application and for the user device (where the applications are running), or by the party implementing the store application 1001.

When displaying the product information, the store application 1001 queries for the properties and links of the product node/entity. Eventually, it discovers the additional links to the social network ontology and the email ontology that are unknown to the store application 1001 in an operation 1013. Instead of ignoring the links, the store application 1001 queries additional information/metadata of these links from the store ontology and/or the semantic database 1003 in an operation 1015. The store application 1001 then identifies these links to be "followable" (i.e. to be followed by using other applications in the smart space). The identification is done, for example, by matching the base URIs of these links to a well-known URI representing this kind of links. In another embodiment, the store application 1001 looks at the metadata associated with the links to identify the links.

Taking a product feedback link to the social network application 1005 as an example, the store application 1001 needs to figure out how to represent the new data of the requested product that is unknown to itself. To do so, the store application 1001 examines the corresponding node in the social network ontology that is connected with the node in the store ontology for its properties. After examining the product node in the social network ontology, the store application 1001 knows the nature of the product node. In another embodiment, the store application 1001 uses the URI of the product feedback link to query the semantic database 1003 for more information, such as reference to the application (e.g., the social network application) responsible for handling of this link type. The semantic database 1003 returns the reference to the social network application 1005 to the store application 1001.

In both embodiments, what the store application 1001 gets back is a piece of information that enables it to place an object on its "product detail" screen. This information may include: hypertext markup language (HTML) fragment, cascading style sheets (CSS) resource(s), hints, additional menu items, references to the public graphics resources, etc. A CSS sheet is an extensible markup language (XML) document rendered by using the styles provided by someone else. Thus, the provider of the data can use display styles from someone else and the owner of a display style can use the data from another provider to render them.

The product node is also an integration point between the store ontology and the social network ontology. The store application 1001 defines this product node using the common integration semantics that contain the information helping the store application 1001 to properly render in its own webpage an entry point for the product information within the social network ontology graph (e.g., a product feedback blog thereof).

Thereafter, the store application 1001 invokes the social network application 1005 using a common layer interface to query the rendering options for the given context (e.g., the request product node, the link to the requested product node, etc.) in an operation 1017. The store application 1001 displays to the user in its own webpage the information provided by the social network application 1005. In this way, the store application 1001 effectively passes its context directly to the social network application 1005, and then asks the social network application 1005 to render whatever it wants for the product node and the link via a call in an operation 1019.

When navigating in the product information page, the user selects (by touching, clicking, etc.) the "product reviews" link in an operation 1021. At this point, the store application 1001 already knows that this product item is handled by the social network application 1005, so it passes control to the social network application 1005 with complete context information in an operation 1023. The social network application 1005 activates and provides the complete blog functionality for the product review feed, including reading and posting the comments etc. in an operation 1025. This provides a special "enabler" entry point for the social network application 1005. When the user closes the product review sub-screen supplied by the social network application 1005, the control is returned back to the store application 1001 in an operation 1027.

Figure 11:
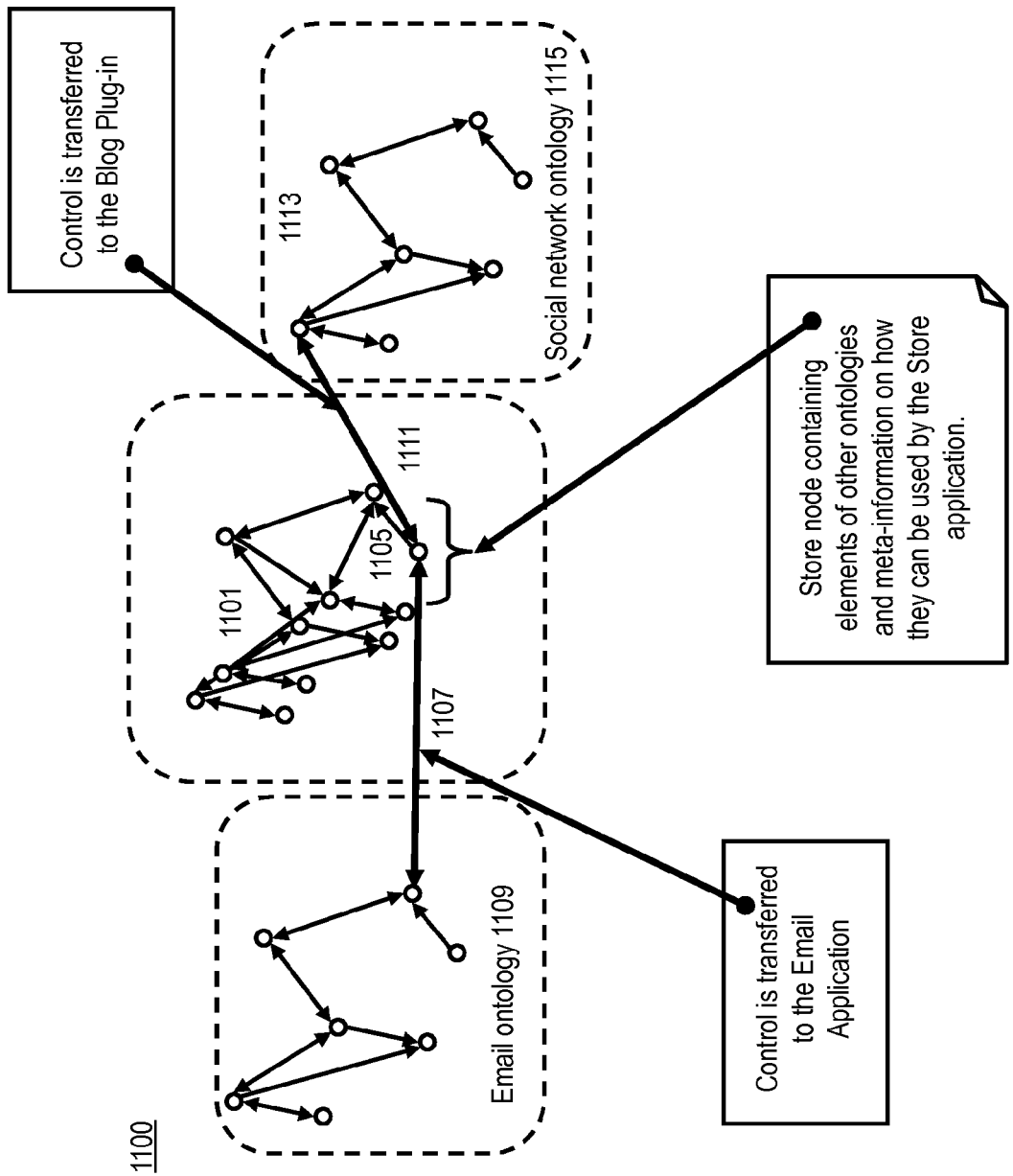
FIG. 11 shows nodes and links among different application ontologies, according to one embodiment.

FIG. 11 shows nodes and links among different application ontologies, according to one embodiment. Considering the example 1100 in FIG. 10, the store application displays the information related to the product catalog as a RDF graph 1101. The store application follows the store ontology 1103 by sliding back and forth along the edges of the graph 1101. Eventually, it arrives at a product-detail screen represented by a product node 1105. The node 1105 contains elements of other ontologies (e.g., email ontology 1109, social network ontology 1115, etc.) and metadata on how the ontologies and metadata can be used by the store application. The email ontology 1109 and the social network ontology 1115 are provided as examples. Other ontologies may include walkout ontology, talk ontology, publication ontology, photo ontology, etc. The possibilities are unlimited.

By way of example, to share the product information by email, a new type of link 1107 is introduced from the store ontology 1103 to the email ontology 1109. In a similar way, a link 1111 is set up between the product node 1105 in the store ontology and a blog node 1113 in the social network ontology 1115.

When displaying the product information, the store application queries the properties and links of the product node 1105. Eventually, it discovers the additional links 1107, 1111 as unknown to itself. The store application queries additional information about these links from the semantic database, and identifies these links to be "followable". This identification is done by matching the URIs of these links to a well-known URI representing this kind of links, or by looking at the metadata associated with the links 1107, 1111.

The store application then determines how to represent the product data by examining the node 1113 to learn the nature of this integration point, or using the URI of the link 1111 to query the semantic database for the reference to the application responsible for handling of this link type. After receiving a reference to the social network application, the store application invokes the social network application using the common plug-in interface to query the rendering options for the given context of the node 1105, the link 1111, etc. In both cases, the store application receives a piece of information that enables it to place an object on its "product detail" screen (corresponding to the product node 1105). The store application then displays the product information provided by the social network application.

Figure 12:
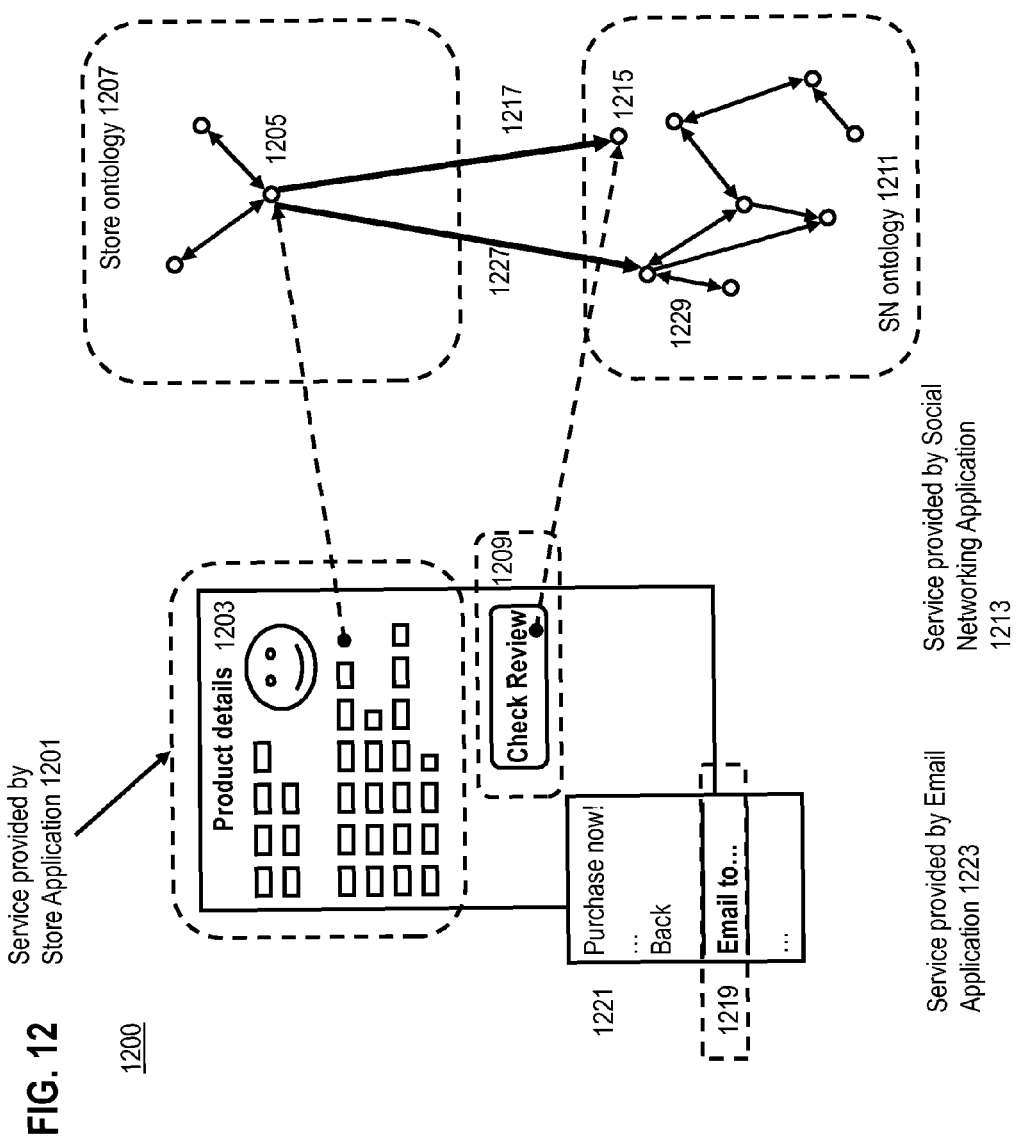
FIG. 12 is a diagram of a product information page shown in the store application while supported by both the store application and the social network application, according to one embodiment.

FIG. 12 is a diagram 1200 of a product information page shown in the store application 1201 that is supported by the social network application, according to one embodiment. The store application 1201 enables a user to "navigate" through the store database. The product information of a node 1205 is queried from the semantic database using the store ontology 1207. A consumer review node 1215 identifies the product review is semantically linked to the product node 1205 via a link 1217.

The email and social networking applications are integrated and deployed after the store application 1201 to support two use cases related to the store: emailing the product description to someone, and providing access to a mini-blog where the user can read and post product reviews.

By way of example, the social network ontology 1207 defines one additional property for the "product" node 1205. This property is a "link" in OWL terminology and is a "predicate" in generic triple terminology. This link is identified, like all other links, with a URI. At this moment, the store application 1201 does not understand this URI because it was unknown. Thus, the store application 1201 does not know what to do with this additional information.

In this embodiment, the social networking application creates a new link 1209 from the "product" node 1227 to another node 1229 located in the social network ontology 1211. The link 1217 is a generic type known as "UI-navigable". The semantic web enables several methods to provide an UI-navigable link. In one embodiment, the UI-navigable link is provided by using a particular well-known URI for these links. In another embodiment, the UI-navigable is provided by using a well-known linked node class, or by adding a superclass for a link 1227 and a node 1229. The superclass enables for a generic interface to include specialized functionality through the use of virtual functions as discussed later.

The store application 1201 detects an unknown data node/entity 1229 linked from the social network ontology to itself. Although the store application 1201 does not understand the semantic of this new data node 1229, it understands that the link 1227 identifies a resource or action that can be handled by another application or plug-in. So the store application 1201 fetches the graph fragment starting from the node 1229 via the link 1227 to get more information. The semantic of the link 1227 and the node 1229 are unknown to the store application 1201, while the semantic of the link 1217 and the node 1215 is known due to their are well-known properties and classes. In this embodiment, the links 1217 and 1227 as well as nodes 1215 and 1229 are separated to clarify the difference between the social network "data" nodes 1229 and a social network "integration" node 1215. In another embodiment, the links 1217 and 1227 as well as nodes 1215 and 1229 are combined using the capabilities of OWL and RDF.

The superclass node 1229 contains a number of properties and other linked nodes that tell the store application: a name of the handling application (e.g. the social network application), one or more context identifiers to pass to the social network application so the social network application can understand why it is called, and instructions on how the link 1227 can be displayed to the user (e.g., a fragment of HTML with styles for the social network, a menu item for email, etc.) so the user can initiate the interaction with another application or plug-in.

The store application 1201 allocates an area on the screen and places the content fetched from the semantic database on the screen. The store application 1201 does not know what exactly is there. In the example, it is a touch or clickable button. A "Check Review" tab 1209 is available for the user to select to browse consumer review available in the social network ontology 1211 via the service provided by the social network application or plug-in 1213. The user eventually acts on this content by selecting the "Check reviews" tab 1209. This event starts the social networking application in a particular context of the node 1229. The social networking application enables the user to read/write product reviews. When the use associated with the product reviews is finished, the control is returned back to the store application 1201. Alternatively, the user can start a "full" social networking application and go to the user's account there.

By analogy, the user can select an "Email to . . . " tab 1219 in a drop-down menu 1221 to invoke the service by the email application and/or plug-in 1223. In the drop-down menu 1221, the user can select the entry "Purchase now!" 1225 to invoke a purchasing application to process an order of the request product. The interaction of ordering the product in the store application 1201 does not require a full-screen. The presentation of the tabs depends on how the store application invokes/launches the social networking application and the email application.

When the applications are deployed according to the proposed approach described in the above-described embodiments, new use cases can be implemented on the fly without having to update and redeploy the applications. By analogy, the existing use cases can be modified and/or disabled on the fly without modifying the applications.

For example, the store may initially use the blog functionality provided by the external social network application. Subsequently, the store switches to its internal feedback service application without modifying the store application or the social network application. The stores application just gets another integration/entry point on the data graph. The application integration using this approach is not done between a store application and a social network application. It is done once for any applications that support the store and social network ontologies. Thus, replacing the social network application with another one does not break the integration, providing that the new application properly implements the plug-in and supports the required semantic links.

The above-described embodiments provide means to control application behaviors and the inter-application interactions using the application data in the semantic web. The above-described embodiments provide also means to access integration points using a uniform data access policy as offered by the semantic database.

The processes described herein for integrating applications on demand to display and manipulate a semantic resource may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
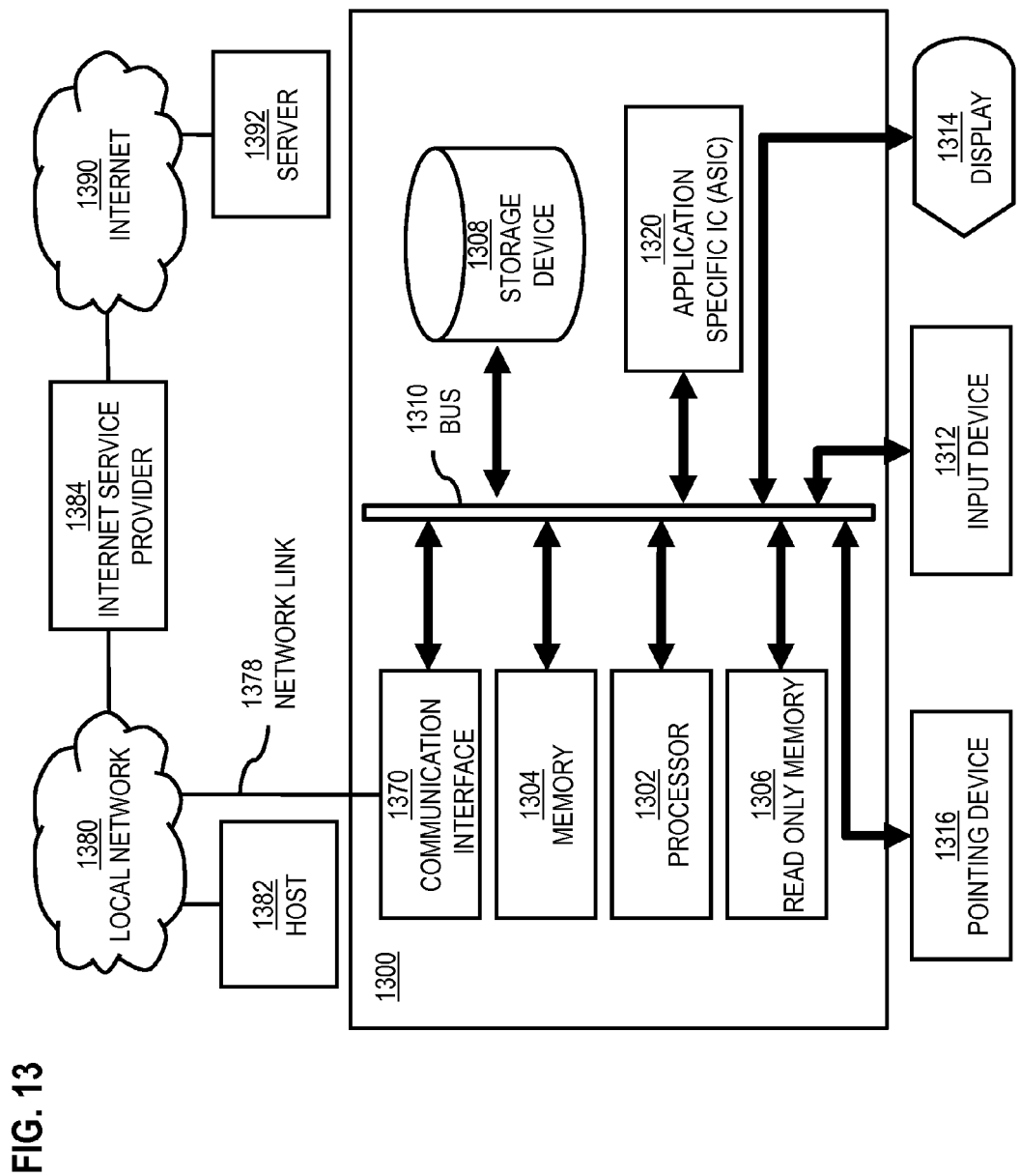
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to integrate applications on demand to display and manipulate a semantic resource as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of integrating applications on demand to display and manipulate a semantic resource.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to integrate applications on demand to display and manipulate a semantic resource. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for integrating applications on demand to display and manipulate a semantic resource. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for integrating applications on demand to display and manipulate a semantic resource, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection from the UE 101 to the communication network 105 for integrating applications on demand to display and manipulate a semantic resource.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
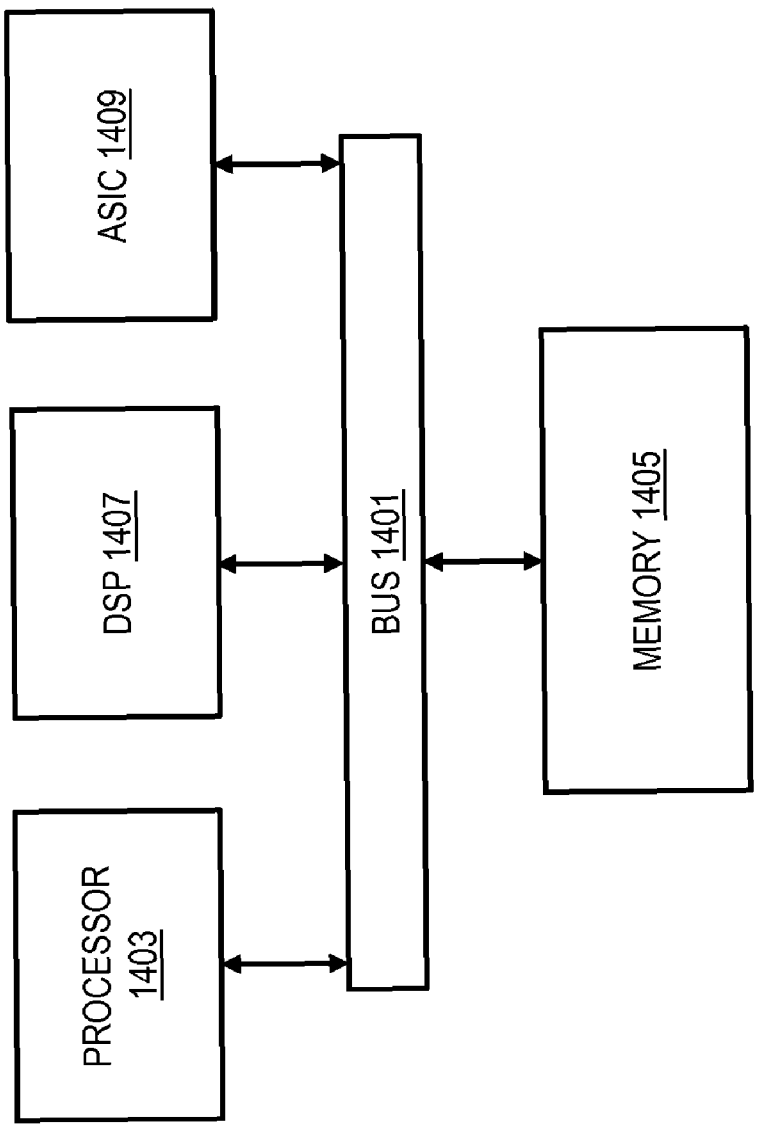
FIG. 14 is a diagram of a chip set that can be used to implement an embodiment of the invention.

FIG. 14 illustrates a chip set or chip 1400 upon which an embodiment of the invention may be implemented. Chip set 1400 is programmed to integrate applications on demand to display and manipulate a semantic resource as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of services. Chip set or chip 1400, or a portion thereof, constitutes a means for performing one or more steps of integrating applications on demand to display and manipulate a semantic resource.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to integrate applications on demand to display and manipulate a semantic resource. The memory 1405 also stores the data associated with or generated by the execution of the inventive steps.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of integrating applications on demand to display and manipulate a semantic resource. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor (s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of integrating applications on demand to display and manipulate a semantic resource. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to integrate applications on demand to display and manipulate a semantic resource. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, reception of a request for a semantic resource;

determining whether the semantic resource is known to a first application;
discovering one or more properties of the semantic resource based, at least in part, on the determination;
identifying a second application associated with the semantic resource based, at least in part, on the one or more properties;
defining the semantic resource as a semantic integration point between the first application and the second application based, at least in part, on the one or more properties;
retrieving information for the presentation of an indicator of the semantic resource from the second application;
causing, at least in part, presentation of the indicator in a user interface of the first application;
in response to a selection of the indicator in the user interface, invoking the second application; and
causing, at least transfer, of a focus from the first application to the second application for the presentation of the semantic resource.

2. A method of claim 1, further comprising:
establishing a semantic link from the first application to the semantic resource; and
identifying the link by comparing a uniform resource identifier of the link against one or more known uniform resource identifiers, by examining metadata associated with the link, or a combination thereof.

3. A method of claim 1, further comprising:
querying a semantic database for the one or more properties of the semantic resource.

4. A method of claim 1, further comprising:
causing, at least in part, return of the focus to the first application based, at least in part, on a deactivation of the indicator.

5. A method of claim 1, wherein the information includes a hypertext markup language fragment, a cascading style sheet resource, a hint, an additional menu item, a reference to a public semantic resource, or a combination thereof.

6. A method of claim 1, further comprising:
retrieving an ontology associated with the first application, wherein the determination is further based on the ontology.

7. A method of claim 1, further comprising:
causing, at least in part, rendering of the semantic resource through the second application,
wherein the presentation includes the rendering.

8. An apparatus comprising:
at least one processor; and
at least one memory including computer program code for one or more programs,
the at least one memory and the computer program code configured to, with the at least one processor, cause the apparatus to perform at least the following,
cause, at least in part, reception of a request for a semantic resource;
determine whether the semantic resource is known to a first application;
discover one or more properties of the semantic resource based, at least in part, on the determination;
identify a second application associated with the semantic resource based, at least in part, on the one or more properties;
define the semantic resource as a semantic integration point between the first application and the second application based, at least in part, on the one or more properties;
retrieve information for the presentation of an indicator of the semantic resource from the second application;
cause, at least in part, presentation of the indicator in a user interface of the first application;
in response to a selection of the indicator in the user interface, invoke the second application; and
cause, at least transfer, of a focus from the first application to the second application for the presentation of the semantic resource.

9. An apparatus of claim 8, wherein the apparatus is further caused to:
establish a semantic link from the first application to the semantic resource; and
identify the link by comparing a uniform resource identifier of the link against one or more known uniform resource identifiers, by examining metadata associated with the link, or a combination thereof.

10. An apparatus of claim 8, wherein the apparatus is further caused to:
query a semantic database for the one or more properties of the semantic resource.

11. An apparatus of claim 8, wherein the apparatus is further caused to:
cause, at least in part, return of the focus to the first application based, at least in part, on a deactivation of the indicator.

12. An apparatus of claim 8, wherein the information includes a hypertext markup language fragment, a cascading style sheet resource, a hint, an additional menu item, a reference to a public semantic resource, or a combination thereof.

13. An apparatus of claim 8, wherein the apparatus is further caused to:
retrieve an ontology associated with the first application, wherein the determination is further based on the ontology.

14. A computer-readable storage medium carrying one or more sequences of one or more instructions which, when executed by one or more processors, cause an apparatus to at least perform the following steps:
causing, at least in part, reception of a request for a semantic resource;
determining whether the semantic resource is known to a first application;
discovering one or more properties of the semantic resource based, at least in part, on the determination;
identifying a second application associated with the semantic resource based, at least in part, on the one or more properties;
defining the semantic resource as a semantic integration point between the first application and the second application based, at least in part, on the one or more properties;
retrieving information for the presentation of an indicator of the semantic resource from the second application;
causing, at least in part, presentation of the indicator in a user interface of the first application;
in response to a selection of the indicator in the user interface, invoking the second application; and
causing, at least transfer, of a focus from the first application to the second application for the presentation of the semantic resource.

* * * * *